United States Patent
Lin et al.

(10) Patent No.: US 11,502,987 B2
(45) Date of Patent: Nov. 15, 2022

(54) COMMUNICATION SYSTEM AND METHOD FOR PERFORMING THIRD-PARTY AUTHENTICATION BETWEEN HOME SERVICE END AND FOREIGN SERVICE END

(71) Applicant: NATIONAL YANG MING CHIAO TUNG UNIVERSITY, Hsinchu (TW)

(72) Inventors: Ying-Dar Lin, Hsinchu (TW); Asad Ali, Hsinchu (TW)

(73) Assignee: NATIONAL YANG MING CHIAO TUNG UNIVERSITY, Hsinchu (TW)

(*) Notice: Subject to any disclaimer, the term of this patent is extended or adjusted under 35 U.S.C. 154(b) by 0 days.

(21) Appl. No.: 17/356,588

(22) Filed: Jun. 24, 2021

(65) Prior Publication Data
US 2022/0247712 A1    Aug. 4, 2022

(30) Foreign Application Priority Data
Feb. 1, 2021    (TW) .................... 110103666

(51) Int. Cl.
*H04L 29/12* (2006.01)
*H04L 29/06* (2006.01)
*H04L 61/4588* (2022.01)
*H04L 65/1063* (2022.01)
*H04L 9/40* (2022.01)

(52) U.S. Cl.
CPC ...... *H04L 61/4588* (2022.05); *H04L 63/0281* (2013.01); *H04L 63/0876* (2013.01); *H04L 63/20* (2013.01); *H04L 65/1063* (2013.01)

(58) Field of Classification Search
CPC . H04L 63/083; H04L 29/06; H04L 29/08072; H04L 29/08981; H04L 41/0806; H04L 41/12; H04L 41/082; H04L 41/0213; H04W 12/06; H04W 12/00; H04W 12/065; H04W 12/069; G06F 8/65; G06F 9/4416
See application file for complete search history.

(56) References Cited

U.S. PATENT DOCUMENTS

| | | | |
|---|---|---|---|
| 6,020,884 A * | 2/2000 | MacNaughton | H04L 67/535 715/779 |
| 8,214,853 B2 * | 7/2012 | Dasher | H04N 21/63345 725/62 |
| 8,683,565 B2 * | 3/2014 | Backlund | H04L 63/107 709/225 |
| 2002/0169966 A1 * | 11/2002 | Nyman | H04L 63/0407 713/182 |
| 2015/0074259 A1 * | 3/2015 | Ansari | H04M 15/705 709/224 |
| 2018/0300601 A1 * | 10/2018 | Cedola | G06F 9/4881 |

* cited by examiner

*Primary Examiner* — Abdullahi E Salad
(74) *Attorney, Agent, or Firm* — Bacon & Thomas, PLLC

(57) ABSTRACT

A communication system performs a third-party authentication between a home service end and a foreign service end, wherein the home service end and the foreign service end each have a type of a cloud, an edge or a fog. The communication system includes a control module and a plurality of operation modules that are configured in a universal proxy, wherein the universal proxy performs communication with a cloud through a cloud relay, performs communication with an edge through an edge relay, and performs communication with a fog through a fog relay. The control module selects two of the operation modules to perform the third-party authentication according to the types of the home service end and the foreign service end.

20 Claims, 25 Drawing Sheets

| foreign \ home | Cloud | Edge | Fog | Fog-802.1x |
|---|---|---|---|---|
| Cloud | vIdP 22 / vRP 25 | vHSS 27 / vUser 26 | vIdP 22 / vRP 25 | vAS 28 / vUser 26 |
| Edge | vIdP 22 / vUE 23 | vHSS 27 / vMME 24 | vIdP 22 / vUE 23 | vAS 28 / vUE 23 |
| Fog | vIdP 22 / vUser 26, vRP 25 | vHSS 27 / vUser 26 | vIdP 22 / vUser 26, vRP 25 | vAS 28 / vUser 26 |
| Fog-802.1x | vIdP 22 / vUser 26 | vHSS 27 / vUser 26 | vIdP 22 / vUser 26 | vAS28 / vUser 26 |

FIG. 2(A)

| home | | foreign | home module | foreign module | mapping from | mapping to |
|---|---|---|---|---|---|---|
| Cloud | | Cloud | vRP | vIdP | Auth Request passing client_id from SP | Auth Request passing client_id as RP |
| | | Edge | vUser | vHSS | Auth Request (IMSI) | Login with IMSI |
| | | Fog | vRP | vIdP | Auth Request passing client_id from SP | Auth Request passing client_id as RP |
| | | Fog-802.1x | vUser | vAS | RADIUS Access Request | Login Request |
| Edge | | Cloud | vUE | vIdP | Login with IMSI | Auth Request (IMSI) |
| | | Edge | vMME | vHSS | Auth Request (IMSI) | Auth Request (IMSI) as MME |
| | | Fog-OIDC | vUE | vIdP | Login with IMSI | Auth Request (IMSI) |
| | | Fog-802.1x | vUE | vAS | Login with IMSI | Auth Request (IMSI) |
| Fog | OIDC | Cloud | vUser+RP | vIdP | Auth Request passing client_id from SP | Auth Request passing client_id as RP |
| | | Edge | vUser | vHSS | Auth Request (IMSI) | Login with IMSI |
| | | Fog-OIDC | vUser+RP | vIdP | Auth Request passing client_id from SP | Login + Auth Request passing client ID as RP |
| | | Fog-802.1x | vUser | vAS | RADIUS Access Request | Login Request |
| | 802.1x | Cloud | vUser | vIdP | Auth Request passing client_id from SP | EAPOL start request |
| | | Edge | vUser | vHSS | Auth Request (IMSI) | EAPOL start request |
| | | Fog-OIDC | vUser | vIdP | Auth Request passing client_id from SP | EAPOL start request |
| | | Fog-802.1x | vUser | vAS | RADIUS Access Request | EAPOL start request |

FIG. 16

COMMUNICATION SYSTEM AND METHOD FOR PERFORMING THIRD-PARTY AUTHENTICATION BETWEEN HOME SERVICE END AND FOREIGN SERVICE END

BACKGROUND

1. Field of the Disclosure

The present disclosure relates to the technical field of communication and, more particularly, to the technical field of communication authentication.

2. Description of Related Art

With the development of communication technology, cloud communication services have been in widespread use, and fog communication services are also rising. However, the speed of cloud communication and fog communication is usually not as fast as that of local telecom services (or known as edge services). Therefore, when requiring high-bandwidth or low-delay transmission quality, users still need to use the telecommunication services provided by local operators. At present, if users want to use cloud services, fog services, and edge services, they not only must have an account in the cloud, but also must have an account in the fog or edge, and they have to switch accounts to use the three services, which will cause inconvenience. In order to access all three with one account, there must be some sort of third-party authentication and communication mechanism between cloud, edge, and fog. In addition, currently the cloud, fog, and edge use different communication protocols, and thus it is difficult to communicate between the three systems.

In view of this, the present disclosure provides an improved communication system and communication method to solve the aforementioned problems.

SUMMARY

Based on the aforementioned objective, the present disclosure provides a communication system for performing a third-party authentication between the home service end (where a user has an account) and the foreign service end (where a user does not have an account), wherein the types of the home service end and the foreign service end include cloud, edge or fog. The communication system includes: a control module and a plurality of operation modules disposed in a universal proxy. The universal proxy communicates with the cloud through a cloud relay, communicates with the edge through an edge relay, and communicates with the fog through a fog relay. The control module selects at least two of the operation modules for performing third-party authentication according to the types of the home server and the foreign server.

In addition, the present disclosure also provides a communication method that is executed through a communication system to perform third-party authentication between the home server and the foreign server, wherein the types of the home server and the foreign server include cloud, edge and fog, and the communication system includes a control module and a plurality of operation modules. The communication method includes the step of using the control module to select at least two of the operation modules for performing third-party authentication according to the types of the home server and the foreign server, wherein the control module and the operation modules are disposed in the universal proxy and the universal proxy communicates with the cloud through the cloud forwarding terminal, communicates with the edge through the edge forwarding terminal, and communicates with the fog terminal through the fog forwarding terminal, Other objects, advantages, and novel features of the disclosure will become more apparent from the following detailed description when taken in conjunction with the accompanying drawings.

BRIEF DESCRIPTION OF THE DRAWINGS

FIG. 2(A) is a schematic diagram of the operation modules corresponding to the home service end and the foreign service end according to an embodiment of the present disclosure;

FIG. 16 schematically illustrates the forwarding table of a universal proxy according to an embodiment of the present disclosure;

DETAILED DESCRIPTION

The following embodiments describe the implementation and operation principles of the present disclosure. Those skilled in the art to which the present disclosure pertains may understand the features and effects of this disclosure through the above-mentioned embodiments, and may perform combination, modification, replacement or adaption based on the spirit of the present disclosure.

The terns "connected" as used herein refers to aspects such as direct connection or indirect connection, and is not limited thereto. The term "when . . . " herein may denote "during the time that . . . ", "before . . . ", or "after . . . " and is not limited thereto.

The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

When multiple effects (or elements) are described herein, if the term "or" is used between the multiple effects (or elements), it means that the effects (or elements) may exist independently, but it does not exclude that the multiple effects (or elements) may coexist. In other words, as long as the description is reasonable, the term "or" may involve the meaning of "and".

Figure 1:
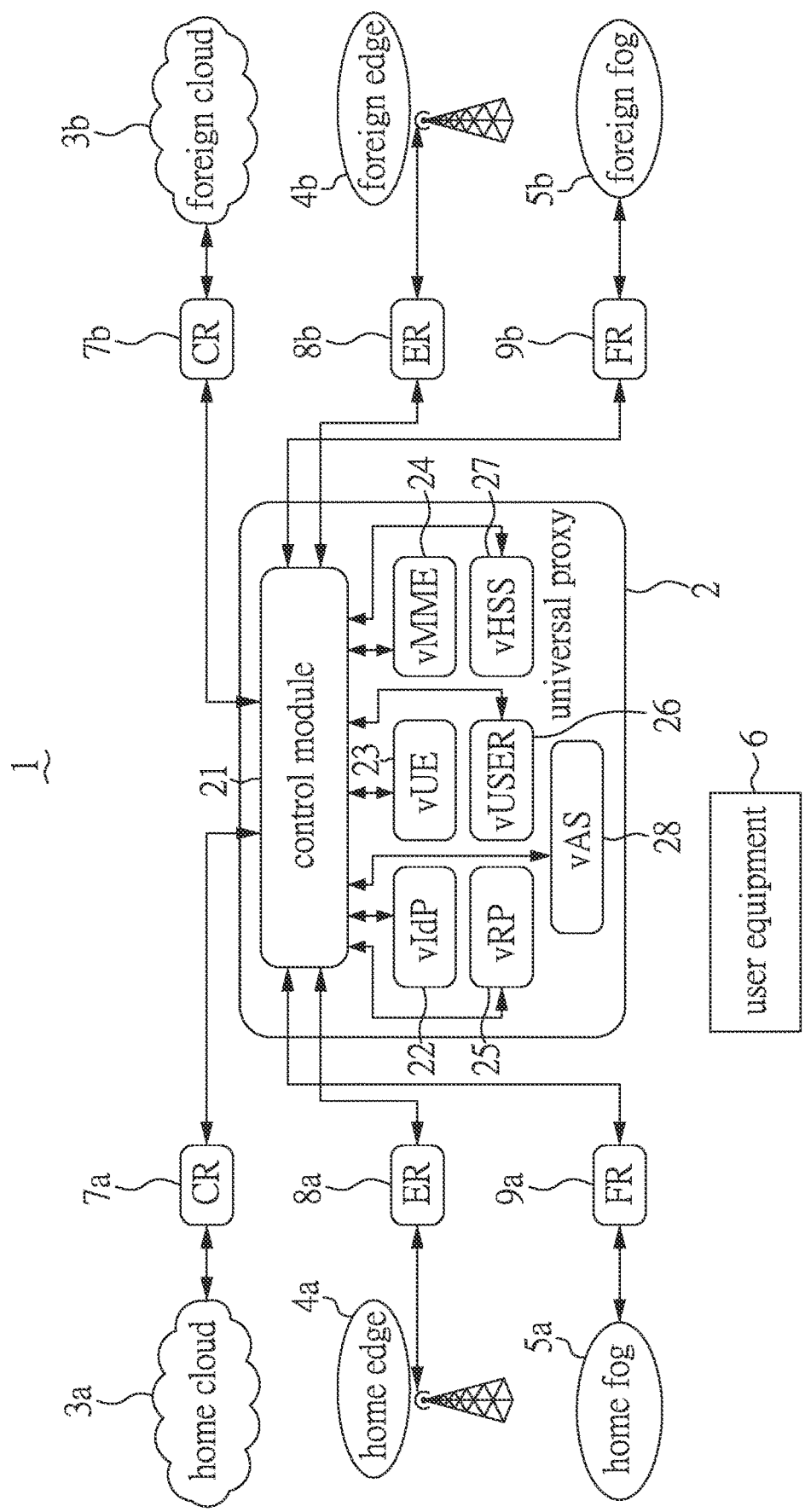
FIG. 1 is a system architecture diagram of the communication system according to an embodiment of the present disclosure.

FIG. 1 is a system architecture diagram of the communication system I according to an embodiment of the present disclosure. As shown in FIG. 1, the communication system 1 of the present disclosure may execute the third-party authentication between the home service end and the foreign service end through a control nodule 21 of a universal proxy 2, wherein the home service end may be a cloud service end 3a (hereinafter referred to as the home cloud 3a), an edge service end 4a (hereinafter referred to as the home edge 4a), or a fog service end 5a (hereinafter referred to as the home fog 5a), and the foreign service end may be a cloud service end 3b (hereinafter referred to as foreign cloud 3b), an edge service end 4b (hereinafter referred to as foreign edge 4b) or a fog service end 5b (hereinafter referred to as foreign fog 5b) . The purpose of the present disclosure is to adopt the account of the home service end to directly use the services of the foreign service end without having to register with the foreign service end. The home service end can be defined as the registered service end for the account, and the foreign service end can be defined as the service end that the account has not yet been registered. The account of the home service end can obtain various communication services provided by the home service end or foreign service end through a user equipment 6.

In one embodiment, the communication system 1 of the present disclosure may include hardware devices and at least part of software of the universal proxy 2. In another embodiment, the communication system 1 of the present disclosure may include at least part of software of the universal proxy 2, for example, only the control module 21.

In an embodiment, the user equipment 6 may be, for example, an electronic device with Internet of Things (IoT) functions, such as a notebook computer, a tablet computer, a desktop computer, a smart phone, and various smart portable devices, but the present disclosure is not limited to this.

In one embodiment, the home cloud 3a and the foreign cloud 3b may be, for example, communication service systems of different e-commerce companies such as Google, Amazon, and T-Mobile, and the services of the home cloud 3a and the foreign cloud 3b may be, for example, various cloud services provided by these e-commerce companies, such as infrastructure as a service (IaaS), software as a service (SaaS), or platform as a service (PaaS), etc., but the present disclosure is not limited to this. In addition, the home edge 4a and the foreign edge 4b may be, for example, communication service systems of different telecommunication companies, such as Hinet, FETnet, AT&T mobile, T-Mobile, Verizon, etc. The services of the home edge 4a and the foreign edge 4b are services provided by various telecommunication companies, such as the third generation partnership project (3GPP), the third generation (3G) mobile communication technology fourth generation (4G) mobile communication technology or fifth generation (5G) mobile communication technology, but the present disclosure is not limited to this. In addition, the home fog 5a and the foreign fog 5b may be, for example, different fog computing communication service systems, such as Veniam, Embotech GmbH, Shield AI, SONM, FogHorn Systems, etc., but the present disclosure is not limited to this.

In one embodiment, the communication protocol used by the home cloud 3a and the foreign cloud 3b is open identity connect (hereinafter abbreviated as OIDC). In order to perform OIDC related authentication, the home cloud 3a and the foreign cloud 3b may each include an open identity provider (hereinafter abbreviated as IdP), a relying party (hereinafter abbreviated as RP) and/or an information endpoint (not shown), wherein IdP, RP and information endpoint are already known to those skilled in the art and thus a detail description is deemed unnecessary.

In one embodiment, the communication protocol used by the home edge 4a and the foreign edge 4b is 3GPP, and the authentication and key agreement protocol (EPS-AKA) of the evolved packet system is used as its authentication mechanism. In order to perform EPS-AKA related authentication, the home edge 4a and the foreign edge 4b each include a mobility management entity (hereinafter abbreviated as MME) and/or a home subscriber server (hereinafter abbreviated as HSS) (not shown). The MME and HSS are known to those skilled in the art and thus a detailed description thereof is deemed unnecessary.

In one embodiment, the communication protocol used by the home fog 5a and the foreign fog 5b may be OIDC or IEEE 802.1x (hereinafter directly referred to as 802.1x). When the home fog 5a and the foreign fog 5b use OIDC, in order to perform OIDC related authentication, the home fog 5a and the foreign fog 5b may include IdP, RP and/or information endpoints (not shown). When the home fog 5a and the foreign fog 5b use 802.1x, in order to perform 802.1x related authentication, the home fog 5a and the foreign fog 5b may include an authentication server (AS) and/or an access point (AP) (not shown). The AS and AP are known to those skilled in the art and thus a detailed description thereof is deemed unnecessary.

In addition, for the convenience of explanation, in the following description, the cross-border service that the account of home service end uses the foreign service end through the user equipment 6 will be directly expressed in the form of "home-to-foreign". For example, when the account of home cloud 3a wants to use the services of unregistered foreign edge 4b, such a cross-border service will be directly expressed as "cloud-to-edge", and when the account of home cloud 3a wants to use the services of unregistered foreign fog 5b and the communication protocol used by the foreign fog 5b is OIDC, such a cross-border service will be directly expressed as "cloud-to-fog(OIDC)". Similarly, the cross-border services that the communication system 1 of the present disclosure can support include at least cloud-to-edge, cloud-to-fog(OIDC), cloud-to-fog (802.1x), cloud-to-cloud, edge-to-edge, edge-to-fog(OIDC), edge-to-fog(802.1x), edge-to-cloud, fog(OIDC)-to-edge, fog(OIDC)-to-fog(OIDC), fog(OIDC)-to-fog(802.1x), fog (OIDC)-to-cloud, fog(802.1x)-to-edge, fog(802.1x)-to-fog (OIDC), fog(802.1x)-to-fog(802.1x) and fog(802.1x)-to-cloud. In addition, the present disclosure may also be expanded to support more communication service systems with different communication protocols.

As shown in FIG. 1, in order to achieve third-party authentication for various cross-border services, the communication environment of the communication system 1 of the present disclosure can be implemented by a universal proxy 2, at least one home service end (home cloud 3a, home edge 4a and/or home fog 5a), at least one home relay (cloud relay 7a, edge relay 8a and/or fog relay 9a), at least one foreign service end (foreign cloud 3b, foreign edge 4b and/or foreign fog 5b), at least one foreign relay (cloud relay 7b, edge relay 8b and/or fog relay 9b), and a user equipment 6. Furthermore, each communication path between each service end (home and foreign) and the universal proxy 2 is provided with a relay for forwarding the message between the service end and the universal proxy 2, wherein the type of the home relay may include a cloud relay (hereinafter abbreviated as CR) 7a, an edge relay (hereinafter abbreviated as ER) 8a, or a fog relay (hereinafter abbreviated as FR) 9a, and the type of the foreign relay may include a CR (cloud relay) 7b, an ER (edge relay) 8b, or an FR (fog relay) 9b.

It is noted that the communication system 1 of the present disclosure may operate in the case that there are a single home service end and a single foreign service end, or in a case that there are multiple home service ends and multiple foreign service ends.

In addition, the communication system I further has a plurality of operation modules 22-28. The operation modules 22-28 can be disposed in the universal proxy 2, wherein the control module 21 may control the operation modules 22-28 to perform operations required for third-party authentication of various cross-border services. In addition, the control module 21 may select at least two of the operation modules 22-28 according to the types of the home service end and the foreign service end to perform the operations required for third-party authentication. In other words, for different cross-border services, different operation modules 22~28 are used.

In one embodiment, the types of the operation modules 22~28 may include a virtual open identity provider (hereinafter abbreviated as vIdP) 22, a virtual user equipment (hereinafter abbreviated as vUE) 23, a virtual mobility management entity (hereinafter abbreviated as vMME) 24, a virtual relying party (hereinafter abbreviated as vRP) 25, a virtual user (hereinafter abbreviated as vUSER) 26, a virtual home subscriber server (hereinafter abbreviated as vHSS) 27, and a virtual authentication server (hereinafter abbreviated as vAS) 28. For the convenience of explanation, the abbreviation will be used to directly represent each operation module in the following description. In addition, as long as it is applicable, the operation modules 22~28 in the universal proxy 2 may he arbitrarily increased or decreased according to the actual requirements.

In one embodiment, the control module 21 may be a control chip of the universal proxy 2, in another embodiment, the control module 21 may be a computer program product (software) or firmware executed by a microprocessor or a microcontroller of the universal proxy 2. In one embodiment, the operation modules 22~28 may be implemented by hardware components of the universal proxy 2 in cooperation with software or firmware. In another embodiment, the operation modules 22~28 themselves are software or firmware. When the control module 21 and the operation modules 22~28 are all software, the control module 21 and the operation modules 22~28 can be integrated together. For example, the control module 21 is the main program, and the operation modules 22~28 are subroutines. However, the present disclosure is not limited to this. As a result, the implementation of the control module 21 and the operation modules 22~28 can be understood.

Next, the functions of the operation modules 22~28 are described as follows:

vIdP (virtual open identity provider) 22, which is used to communicate with a foreign service end using OIDC, for example, to communicate with a foreign cloud 3b through CR 7b, or to communicate with a foreign fog 5b using OIDC through FR 9b;

vUE (virtual user equipment) 23, which is used to communicate with the edge 4a of home service end, for example, to communicate with the MME of the home edge 4a through the ER 8a;

vMME (virtual mobility management entity) 24, which is used to communicate with the vHSS 27 of the universal proxy 2, or to communicate with the edge 4a of the home service end, such as the HSS of the home edge 4a through ER 8a;

vRP (virtual relying party) 25, which is used to communicate with the home service end using OIDC, for example, to communicate with the IdP of the home cloud 3a through CR 7a, or to communicate with the IdP of the home fog 5a through FR 9a;

vUSER (virtual user) 26: can be used to communicate with the home server using OIDC and 802.1x, for example, to communicate with the information endpoint of the home cloud 3a through CR 7a, or to communicate with the information endpoint of the home fog 5a through FR 9a;

vHSS (virtual home subscriber server) 27, which is used to communicate with the vMME 24 of the universal proxy 2, or to communicate with the foreign service end using 3GPP, for example, to communicate with the vMME of the foreign edge 4b through ER 8b; and vAS (virtual authentication server) 28, which is used to communicate with the foreign service end using 802.1x protocol, for example, to communicate with the AS of the foreign fog 5b through FR 9b.

In addition, according to the difference between the home service end and the foreign service end, the control module 21 will use different operation modules for third-party authentication. FIG. 2(A) is a schematic diagram of the operation modules corresponding to the home service end and the foreign service end according to an embodiment of the present disclosure.

As shown in FIG. 2(A), when the cross-border service is cloud-to-edge, the control module 21 activates vHSS 27 and vUSER 26.

When the cross-border service is edge-to-edge, the control module 21 activates vHSS 27 and vMME 24.

When the cross-border service is fog (OIDC)-to-edge, the control module 21 activates vHSS 27 and vUSER 26.

When the cross-border service is fog (802.1x)-to-edge, the control module 21 activates OBS 27 and vUSER 26.

When the cross-border service is cloud-to-cloud, the control module 21 activates vIdP 22 and vRP 25.

When the cross-border service is edge-to-cloud, the control module 21 activates vIdP 22 and vUE 23.

When the cross-border service is fog (OIDC)-to-cloud, the control module 21 activates vIdP 22, vRP 25 and vUSER 26.

When the cross-border service is fog (802.1x)-to-cloud, the control module 21 activates vIdP 22 and vUSER 26.

When the cross-border service is cloud-to-fog (OIDC), the control module 21 activates vIdP 22 and vRP 25.

When the cross-border service is edge-to-fog(OIDC), the control module 21 activates vIdP 22 and vUE 23.

When the cross-border service is fog (OIDC)-to-fog (OIDC), the control module 21 activates vIdP 22, vRP 25 and vUSER 26.

When the cross-border service is fog (802.1x)-to-fog (OIDC), the control module 21 activates vIdP 22 and vUSER 26.

When the cross-border service is cloud-to-fog (802.1x), the control module 21 activates vAS 28 and vUSER 26.

When the cross-border service is edge-to-fog (802.1x), the control module 21 activates vAS 28 and vUE 23.

When the cross-border service is fog (OIDC)-to-fog (802.1x), the control module 21 activates vAS 28 and vUSER 26.

When the cross-border service is fog (802.1x)-to-fog (802.1x), the control module 21 activates vAS 28 and vUSER 26.

In view of the aforementioned description, it can be seen that the communication system 1 must recognize the type of cross-border service in order to activate the appropriate operation modules 22~28. Therefore, one of the technical focuses of the present disclosure is "how to identify the types of the home service end and the foreign service end". In order to enable the universal proxy 2 to identify the types of the home service end and the foreign service end for performing different authentication processes, the communication system 1 may execute a special communication method.

It should be noted that, in order to make the process simpler and clearer, in the various process steps below, it may omit the steps of forwarding messages between each service end and the universal proxy 2 through the relay, but in fact the messages between the home service end and the universal proxy 2 and the messages between the foreign service end and the universal proxy 2 have to be forwarded through the corresponding relays as intermediate media.

Figure 2B:
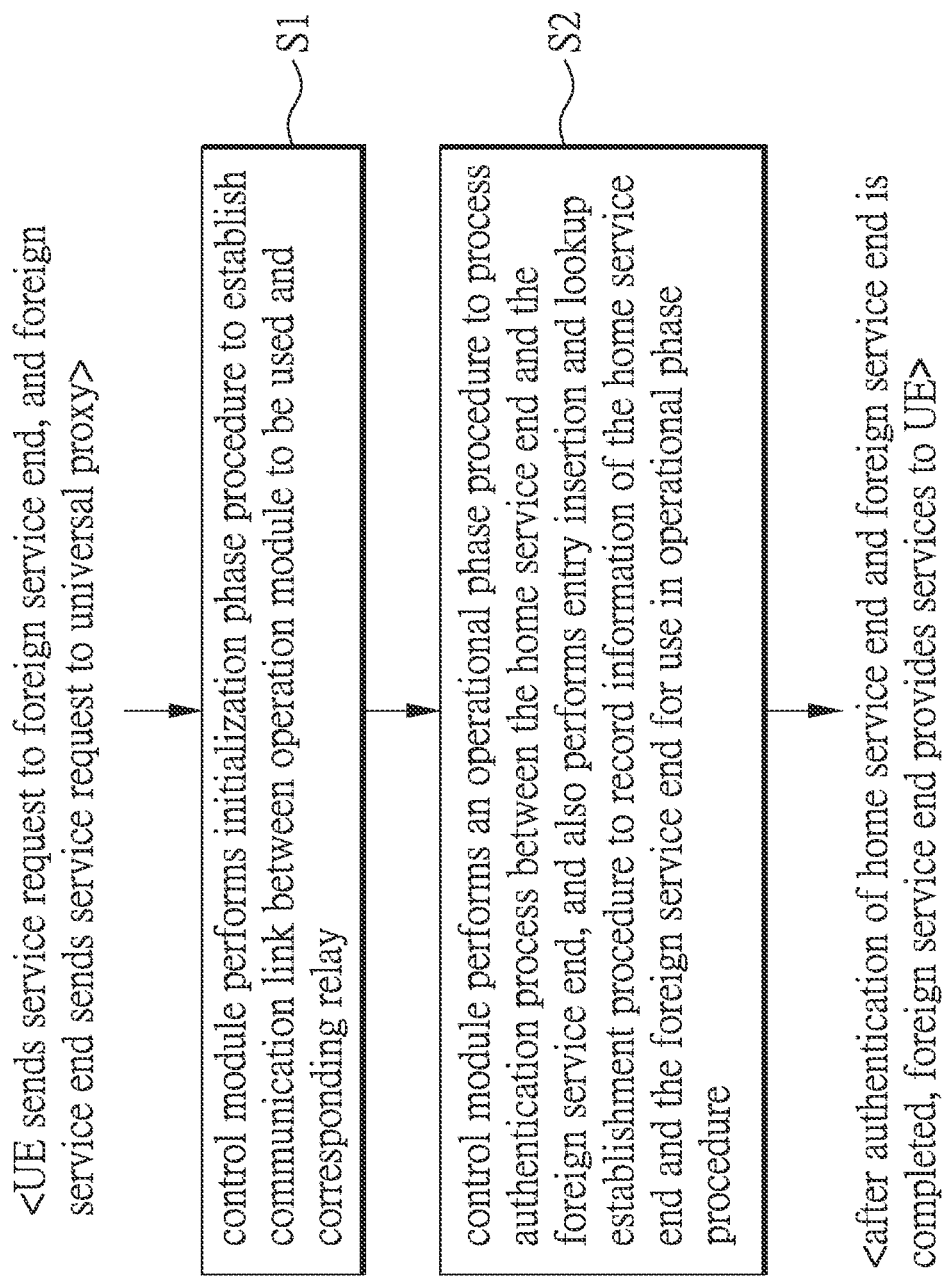
FIG. 2(B) is a flow chart illustrating the steps of the communication method according to an embodiment of the present disclosure.

FIG. 2(B) is a flowchart illustrating the steps of the communication method according to an embodiment of the present disclosure, and please refer to FIGS. 1 to 2(A) at the same time. As shown in FIG. 2(B), when the account of the home service end wants to use the services of the foreign service end, the user equipment 6 sends a service request to the foreign service end, and the foreign service end further sends the service request to the universal proxy 2. When the universal proxy 2 receives the service request, step S1 is executed, in which the control module 21 performs an initialization phase procedure to establish the communication link between the operation module 22~28 to be used and the corresponding relay. Then, step S2 is executed, in which the control module 21 performs an operational phase procedure to process the authentication process between the home service end and the foreign service end. In addition, the control module 21 may also perform an entry insertion and lookup establishment procedure to establish a lookup data form, wherein the lookup data form can record the information of the home service end and the foreign service end for use in the operational phase procedure. After the authentication of the home service end and the foreign service end is completed, the foreign service end may provide services to the user equipment 6, so that the account of the home service end may use the services of the foreign service end. It is noted that the aforementioned sequence of the initialization phase procedure, the operational phase procedure, and the entry insertion and lookup establishment procedure is for illustrative purpose only and, for example, it is applicable that the initialization phase procedure and the operational phase procedure can be executed at the same time.

Next, the details of each procedure will be explained as follows.

Figure 3:
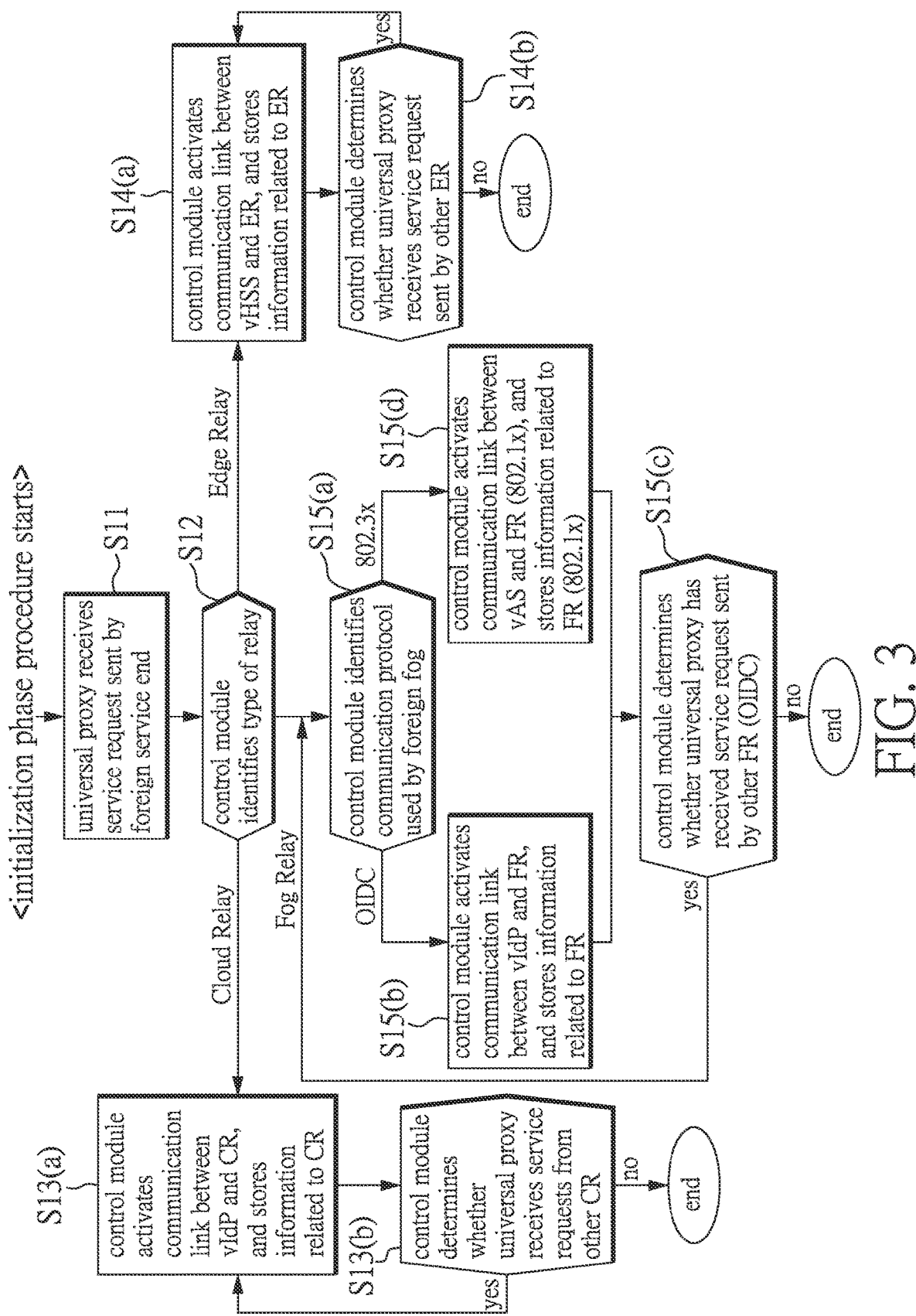
FIG. 3 is a flow chart illustrating the steps of the initial stage procedure of the communication method according to an embodiment of the present disclosure.

First, the details of the "initialization phase procedure" will be explained. FIG. 3 is a flowchart illustrating the steps of the initialization phase procedure of the communication method according to an embodiment of the present disclosure, and please refer to FIG. 1 to FIG. 2(B) at the same time.

In the initialization phase procedure, step S11 is first executed, in which the universal proxy 2 receives a service request sent by a service end through a relay.

Then, step S12 is executed, in which the control module 21 identifies the type of the relay. In one embodiment the universal proxy 2 may pre-record the connection path between each home relay and each foreign relay. Therefore, the control module 21 only needs to match the current connection path with the pre-recorded data, so as to identify the type of When the control module 21 identifies that the relay is CR 7b, step S13(a) is executed, in which the control module 21 activates the communication link between vIdP 22 and CR 7b, so that vIdP 22 may send messages to and receive message from CR 7b, and store information related to CR 7b. In one embodiment, the related information of the relay (for example, CR 7b) may include assigned cloud ID, cloud relay ID and mapping information. In one embodiment, the control module 21 may receive service requests from multiple CR 7b at the same time. Therefore, step S13(b) may be executed, in which the control module 21 may determine whether the universal proxy 2 receives service requests from other CR 7b. If received, step S13(a) is executed again; otherwise, the initialization phase procedure is completed.

When the relay is ER 8b, step S14(a) is executed, in which the control module 21 activates the communication link between vHSS 27 and ER 8b, so that vHSS 27 can send messages to and receive messages from ER 8b, and store the information related to ER 8b. In one embodiment, the related information of the relay (for example, ER 8b) may include assigned edge ID, edge relay ID and mapping information; while the invention is not limited thereto. In one embodiment, step S14(b) may be executed, in which the control module 21 may determine whether the universal proxy 2 receives the service request sent by other ER 8b and, if yes, execute step S14(a) again; otherwise the initialization phase procedure is completed.

When the relay is FR 9b, since the communication protocol used by the corresponding foreign fog 5b may be OIDC or 802.1x, step S15(a) is thus executed first, in which the control module 21 identifies the communication protocol used by the foreign fog 5b, where the method of identifying the communication protocol may be implemented by, for example, "trying to login". For example, if the login method is performed through an access point, the control module 21 may identify that the communication protocol is 802.1x, and if the login method is performed through a web page, the control module 21 may identify that the communication protocol is OIDC.

When the communication protocol is OIDC, step S15(b) is executed, in which the control module 21 activates the communication link between vIdP 22 and FR 9b, so that vIdP 22 can send messages to and receive messages from with FR 9b, and store information related to FR 9b. In one embodiment, the related information of the relay (for example, FR 9b) may include assigned fog ID, fog relay ID and mapping information; while the invention is not limited thereto. Then, step S15(c) may be executed, and the control module 21 may determine whether the universal proxy 2 has received the service request sent by other FR 9b and, if yes, execute step S15(b) again; otherwise, the initialization phase procedure is completed.

When the communication protocol is 802.1x, step S15(d) is executed, in which the control module activates the communication link between vAS 28 and FR 9b, and stores information related to FR 9b. Then, step S15(c) is executed, in which the control module 21 may determine whether the universal proxy 2 has received the service request sent by other FR 9b and, if yes, execute step S15(d) again; otherwise, the initialization phase procedure is completed. In this way, the details of the initialization phase procedure can be understood.

Figure 4:
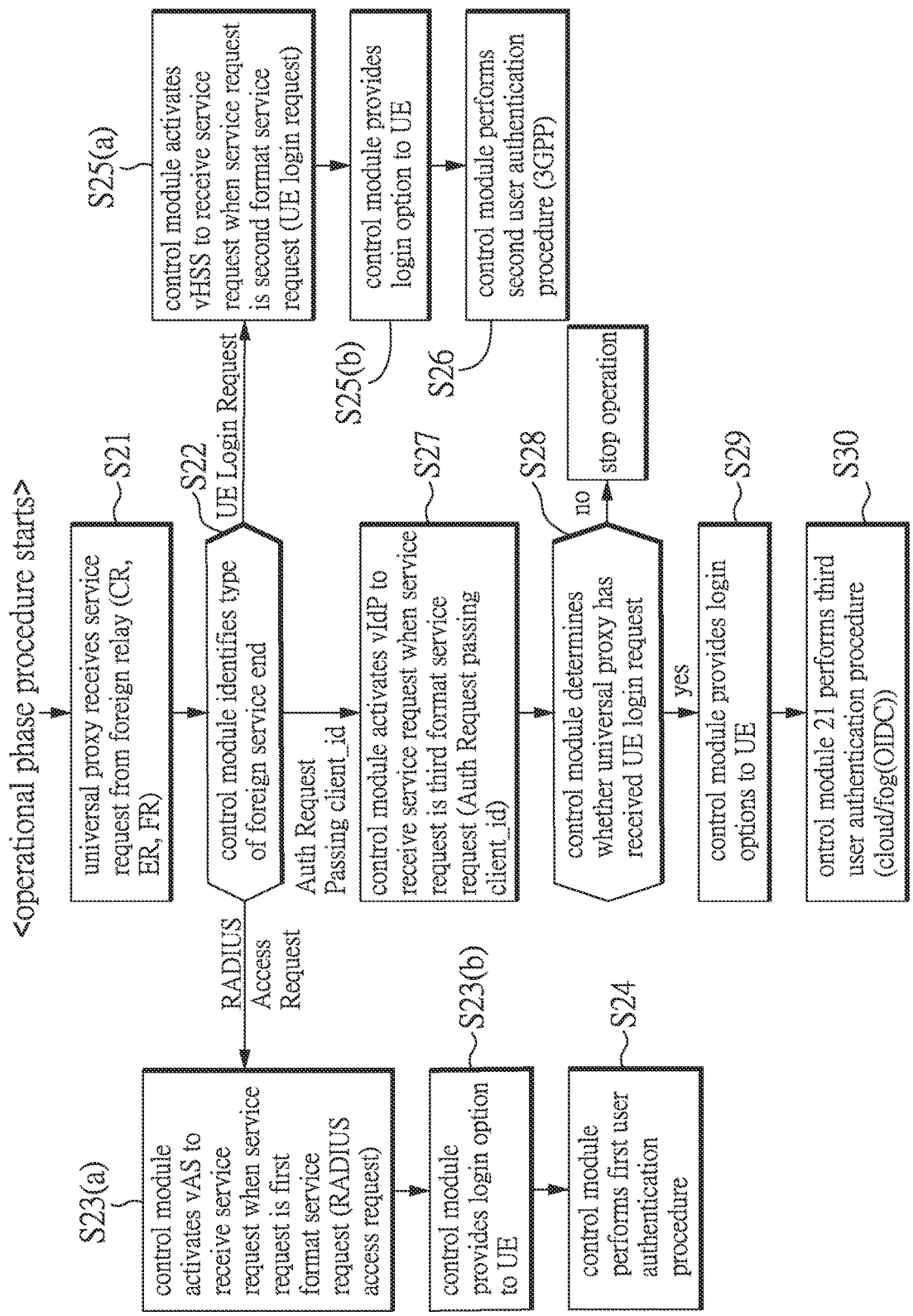
FIG. 4 is a flowchart illustrating the main steps of the operational phase procedure of the communication method according to an embodiment of the present disclosure.

Next, the details of the operational phase procedure will be explained as follows. FIG. 4 is a flowchart illustrating the main steps of the operational phase procedure of the communication method according to an embodiment of the present disclosure, and please refer to FIGS. 1 to 3 at the same time.

First, step S21 is executed, in which the universal proxy 2 receives the service request from the foreign relay (CR 7b, ER 8b, FR 9b).

Then, step S22 is executed, in which the control module 21 identifies the type of the foreign service end according to the format of the service request (for example, the communication protocol). In one embodiment, based on the communication protocols, the types of service requests can be distinguished into first format service request, second format service request, and third format service request, wherein the first format service request is remote authentication dial in user service access request (hereinafter abbreviated as RADIUS access request), which may correspond to the communication protocol 802.1x; the second format service request is user equipment login request (hereinafter abbreviated as UE login request), which may correspond to the communication protocol 3GPP; the third format service request is authentication request passing client_id (hereinafter abbreviated as auth request passing client_id), which may correspond to the communication protocol OIDC. The aforementioned message format is for illustrative purpose only, and the present disclosure is not limited to this.

When the service request is the first format service request (RADIUS access request), step S23(a) is executed, in which the control module 21 activates the vAS 28 to receive the service request and enables the vAS 28 to enter the waiting state. In addition, step S23(b) is also executed, in which the control module 21 provides a login option to the user equipment 6 through the FR 9b and the foreign fog 5b, so that the user equipment 6 may select the home service end to perform authentication. Then, step S24 is executed, in which the control module 21 performs a first user authentication procedure according to the login option returned by the user equipment 6. The first user authentication procedure is defined as, when the foreign service end is a foreign fog 5b using 802.1x, the authentication procedure required to be performed by the home service end and the foreign service end (also referred as user authentication for 802.1x fog). After the first user authentication process is completed, the foreign fog 5b may provide services to the account of the home service end.

When the service request is the second format service request (UE login request), step S25(a) is executed, in which the control module 21 activates the vHSS 27 to receive the service request and enables the vHSS 27 to enter the waiting state. In addition, step S25(b) is also executed, in which the control module 21 provides a login option to the user equipment 6 through the ER 8b and the foreign edge 4b, so that the user equipment 6 may select the home service end for authentication. Then, step S26 is executed, in which the control module 21 performs a second user authentication procedure according to the login option returned by the user equipment 6. The second user authentication procedure is defined as, when the foreign service end uses the edge 4b of 3GPP, the authentication procedure required to be performed by the home service end and the foreign service end (also referred as user authentication for 3GPP edge). After the second user authentication procedure is completed, the foreign edge 4b may provide services to the account of the home service end.

When the service request is the third format service request (Ruth Request passing client_id), step S27 is executed, in which the control module 21 activates the vIdP 22 to receive the service request. The OIDC authentication mechanism still requires the user equipment 6 to return the second format service request (UE login request) for enabling the vIdP 22 to perform subsequent operations, and thus step S28 is executed, in which the control module determines whether the universal proxy has received the user equipment login request.

If it is not received, the control module 21 stops the operation of the universal proxy 6. If it is received, step S29 is executed, in which the control module provides login options to the user equipment 6 through the CR 7b and the foreign cloud 3b (or the FR 9b and the foreign fog 5b (communication protocol is OIDC).

Then, step S30 is executed, in which the control nodule 21 performs a third user authentication procedure according to the login option returned by the user equipment 6, which is defined as, when the foreign service end is a foreign cloud 3*b* or a foreign fog 5*b* using OIDC, the authentication process required to be performed by the home service end and the foreign service end, so that the third user authentication process can also be referred as user authentication for OIDC cloud/fog. After the third user authentication process is completed, the foreign cloud 3*b* or the foreign fog 5*b* may provide services to the home service account.

Next, the details of the first user authentication procedure, the second user authentication procedure, and the third user authentication procedure will be explained.

Figure 5:
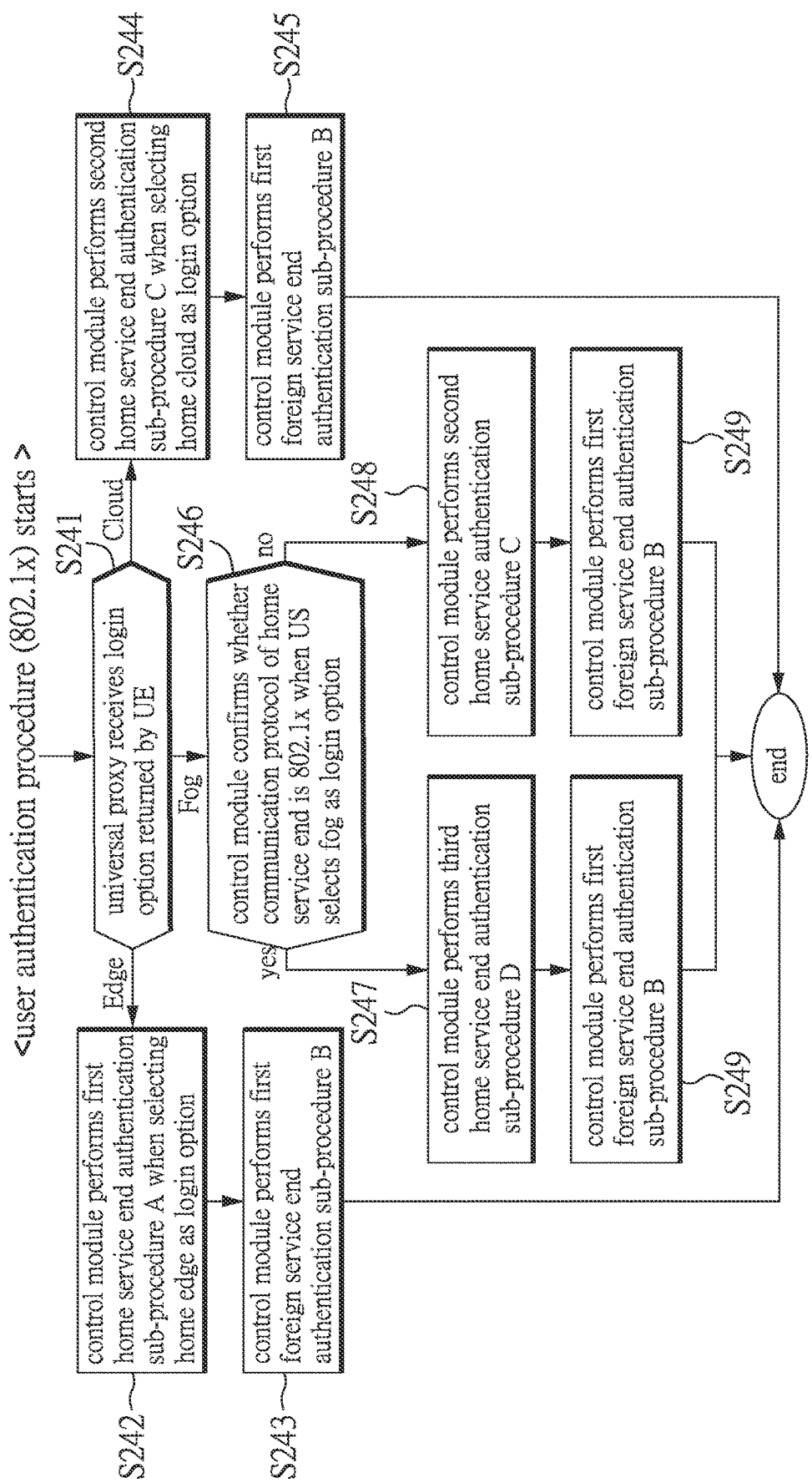
FIG. 5 is a flow chart illustrating the steps of the first user authentication procedure according to an embodiment of the present disclosure.

The first user authentication procedure (that is, the details of step S24) will be explained first. FIG. 5 is a flowchart illustrating the steps of the first user authentication procedure according to an embodiment of the present disclosure, and please refer to FIGS. 1 to 4 at the same time.

As shown in FIG. 5, step S241 is executed first, in which the universal proxy 2 receives the login option returned by the user equipment 6.

When the user equipment 6 selects the home edge 4*a* as the login option (that is, the home service end is the home edge 4*a*), step S242 is executed, in which the control module 21 performs a first home service end authentication sub-procedure A, that is, the authentication procedure performed by the home edge 4*a* when the home service end is the home edge 4*a* (the details can be seen with reference to FIG. 8), When the first home service authentication sub-procedure A is completed, step S243 is executed, in which the control module 21 performs a first foreign service end authentication sub-procedure B, that is, the authentication procedure performed by the control module 21 and the foreign fog 5*b* when the foreign service end is a foreign fog 5*b* using 802.1x, (the details can be seen with reference to FIG. 9), After executing step S243, the edge-to-fog(802.1x) authentication is completed, and the foreign fog 5*b* may provide services to the account of the edge 4*a*.

When the user equipment 6 selects the home cloud 3*a* as the login option (that is, the home service end is the home cloud 3*a*), step S244 is executed, in which the control module 21 performs a second home service end authentication sub-procedure C. The second home service end authentication sub-procedure C is defined as the authentication procedure performed by the control module 21 and the home cloud 3*a* (or the home fog 5*a*) when the home service end is the home cloud 3*a* or the home fog 5*a* using OIDC (the details can be seen with reference to FIG. 10). When the second home service end authentication sub-procedure C is completed, step S245 is executed, in which the control module 21 performs the first foreign service end authentication sub-procedure B. After executing step S245, the cloud-to-fog(802.1x) authentication is completed, and the foreign fog 5*b* may provide services to the account of the home cloud 3*a*.

When the user equipment 6 selects the home fog 5*a* as the login option (that is, the home service end is the home fog 5*a*), step S246 is executed, in which the control module 21 confirms whether the communication protocol of the home fog 5*a* is 802.1x or not.

Figure 11:
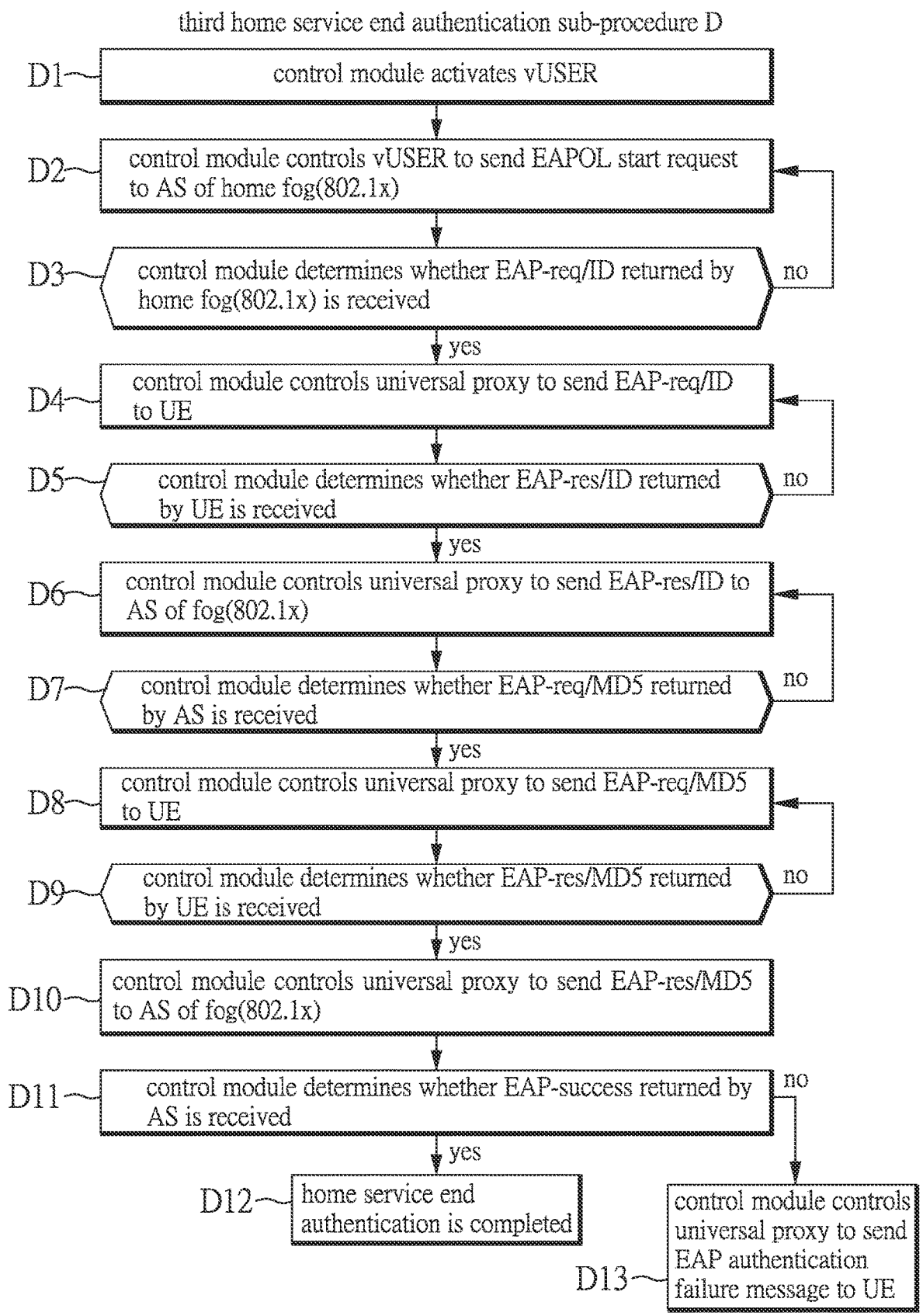
FIG. 11 is a flowchart illustrating the steps of the third home service end authentication sub-procedure according to an embodiment of the present disclosure.

When the communication protocol of the home fog 5*a* is 802.1x, step S247 is executed, in which the control module 21 performs a third home service end authentication sub-procedure D, that is, the authentication procedure performed by the control module 21 and the home fog 5*a* when the home service end is the home fog 5*a* using 802.1x (the details can be seen with reference to FIG. 11). When step S247 is completed, step S249 is executed, in which the control module performs the first foreign service end authentication sub-procedure B. After executing step S249, the fog(802.1x)-to-fog(802.1x) authentication is completed, and the foreign fog 5*b* using 802.1x may provide services to the account of the home fog 5*a*.

If the communication protocol of the home fog 5*a* is not 802.1x but OIDC, step S248 is executed, in which the control module 21 performs the second home service authentication sub-procedure C. When step S248 is completed, step S249 is executed, in which the control module performs the first foreign service end authentication sub-procedure B. After executing step S249, fog(OIDC)-to-fog (802.1x) authentication is completed, and the foreign fog 5*b* using 802.1x may provide services to the account of the home fog 5*a*.

As a result, the details of the first user authentication procedure can be understood.

Figure 6:
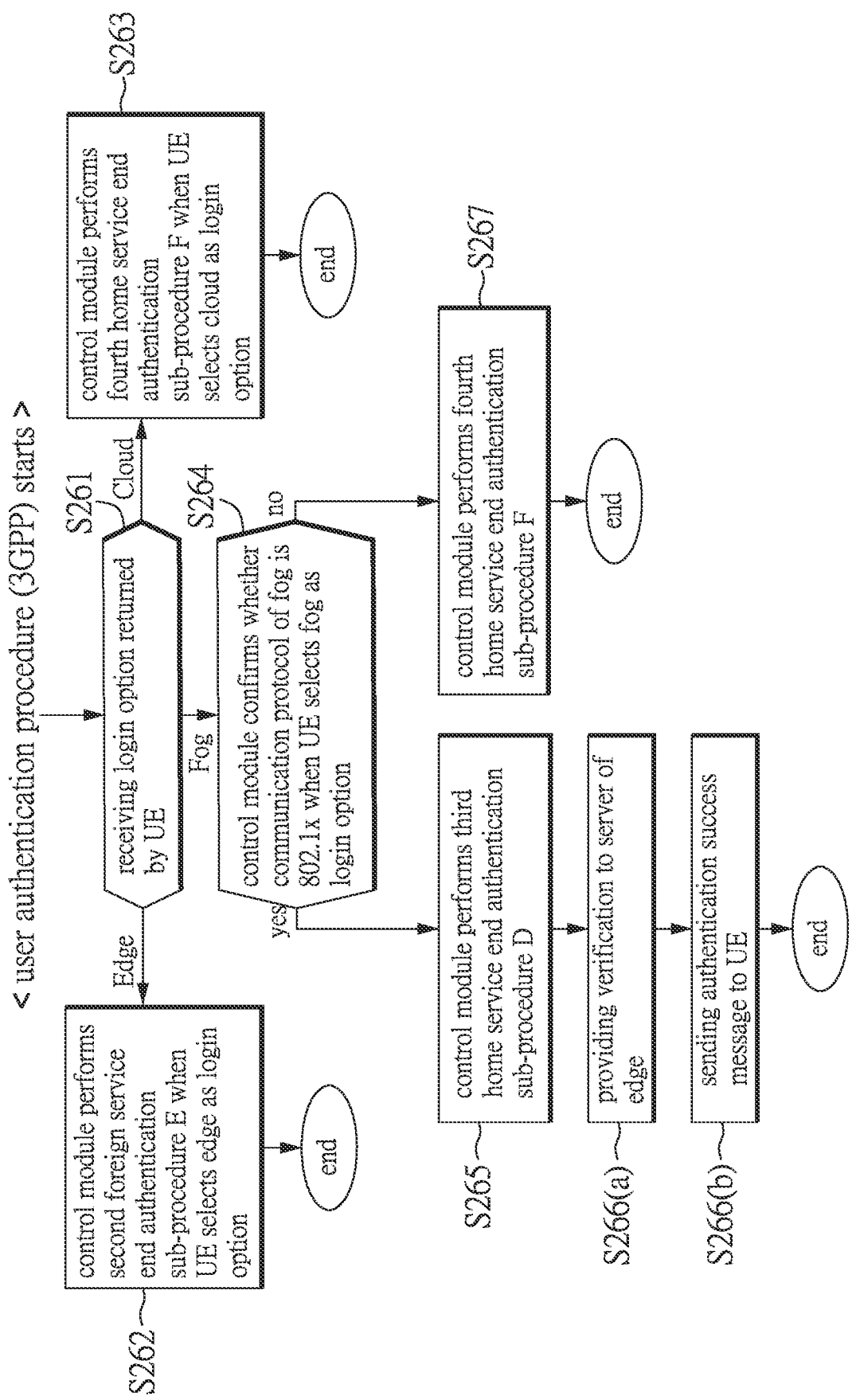
FIG. 6 is a flow chart illustrating the steps of the second user authentication procedure according to an embodiment of the present disclosure.

Next, the details of the second user authentication procedure (that is, the details of step S26) will be described. FIG. 6 is a flowchart illustrating the steps of the second user authentication procedure according to an embodiment of the present disclosure, and please refer to FIGS. 1 to 4 at the same time.

As shown in FIG. 6, step S261 is executed first, in which the universal proxy 2 receives the login option returned by the user equipment 6.

When the user equipment 6 selects the home edge 4*a* as the login option (that is, the home service end is the home edge 4*a*), step S262 is executed, in which the control module 21 performs a second foreign service end authentication sub-procedure E. The second foreign service end authentication sub-procedure E is defined as, when the home service end is the home edge 4*a* and the foreign service end is the foreign edge 4*b*, the authentication procedure required to be performed by the control module 21, the home edge 4*a* and the foreign edge 4*b* (the details can be seen with reference to FIG. 12), After executing step S262 and also completing the EPS-AKA authentication required by the foreign edge 4*b*, the edge-to-edge authentication is completed, and the foreign edge 4*b* may provide services to the account of the home edge 4*a*. In one embodiment, the control module 21 may control the vHSS 27 to provide the authentication vector required for EPS-AKA authentication, and the foreign edge 4*b* and the user equipment 6 will use this authentication vector to perform EPS-AKA authentication. For example, the foreign edge 4*b* may issue a verification challenge to the user equipment 6 according to the authentication vector, and the user equipment 6 may make an authentication response.

When the user equipment 6 selects the home cloud 3*a* as the login option (that is, the home service end is the home cloud 3*a*), step S263 is executed, in which the control module 21 performs a. fourth home service end authentication sub-procedure F. The fourth home service end authentication sub-procedure F is defined as, when the home service end is the home cloud 3*a* or the home fog 5*a* using OIDC, and the foreign service end is the foreign edge 4*b*, the authentication procedure performed by the control module 21 and the home cloud 3*a* (or home fog 5*a*) (the details can be seen with reference to FIG. 13). After executing step S263 and also completing the EPS-AKA authentication required by the foreign edge 4*b*, the cloud-to-edge authentication is completed, and the foreign edge 4*b* may provide services to the account of the home cloud 3*a*.

When the user equipment 6 selects the home fog 5*a* as the login option (that is, the home service end is the home fog 5*a*), step S264 is executed, in which the control module 21 confirms whether the communication protocol of the home fog 5*a* is 802.1x or not.

When the communication protocol of the home service end (fog 5a) is 802.1x, step S265 is executed, in which the control module 21 performs the third home service end authentication sub-procedure D. After executing step S265 and also completing the EPS-AKA authentication required b the foreign edge 4b (S266(a), S266(b)), the fog(802.1x)-to-edge authentication is completed, and the foreign edge 4b may provide services to the account of the home fog(802.1x) 5a.

When the communication protocol of the home fog 5a is OIDC, step S267 is executed, in which the control module 21 performs the fourth home service end authentication sub-procedure F, After executing step S267 and also completing the EPS-AKA authentication required by the foreign edge 4b, the fog(OIDC)-to-edge authentication is completed, and the foreign edge 4b may provide services to the account of the home fog(OIDC) 5a.

As a result, the details of the second user authentication procedure can be understood.

Figure 7:
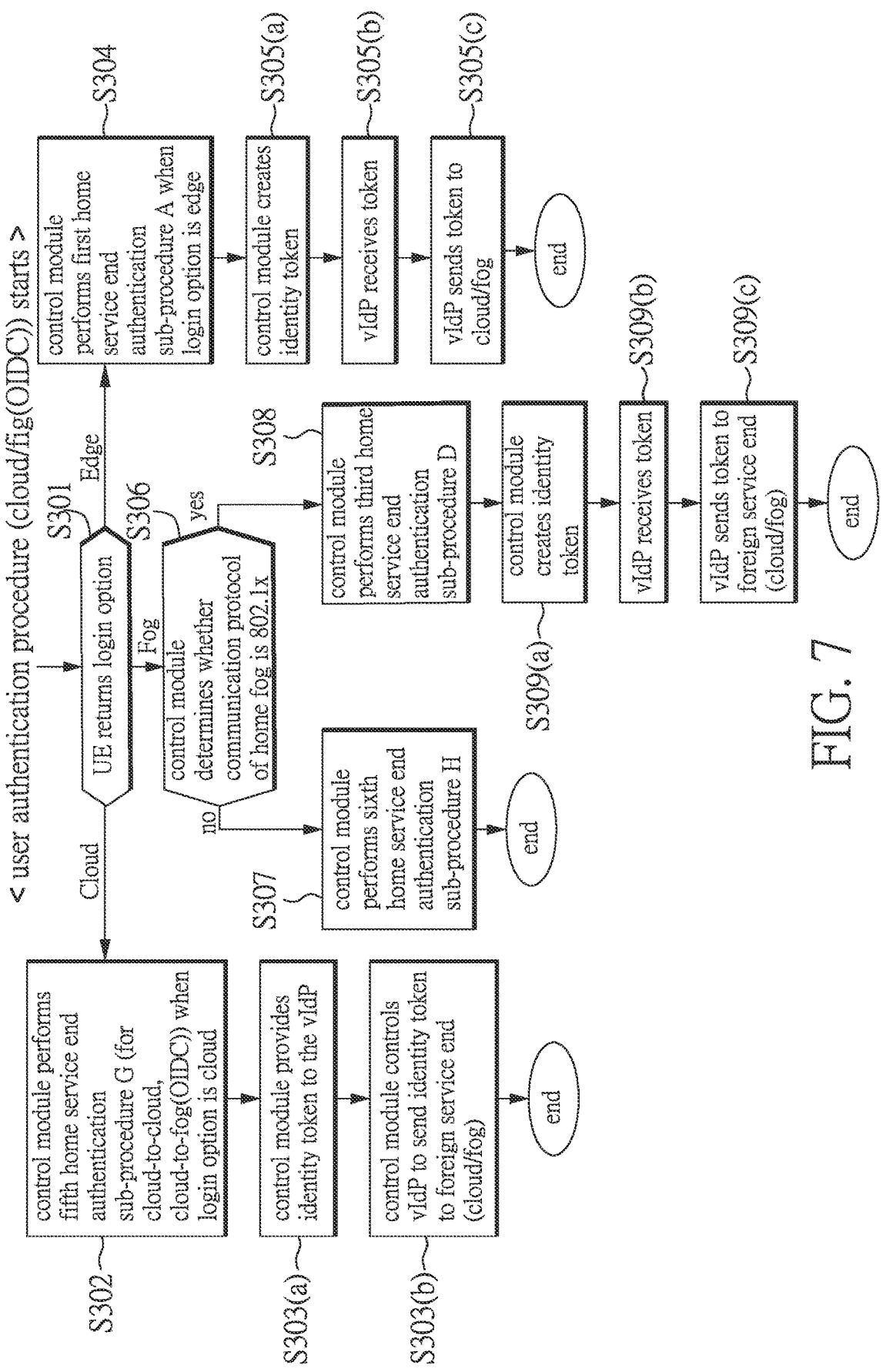
FIG. 7 is a flowchart illustrating the steps of the third user authentication procedure according to an embodiment of the present disclosure.

Next, the details of the third user authentication procedure (that is, the details of step S30) will be described. FIG. 7 is a flowchart illustrating the steps of the third user authentication procedure according to an embodiment of the present disclosure, and please refer to FIGS. 1 to 4 at the same time.

As shown in FIG. 7, step S301 is executed first, in which the universal proxy 2 receives the login option returned by the user equipment 6.

When the login option is the home cloud 3a, step S302 is executed, in which the control module 21 performs a fifth home service end authentication sub-procedure G The fifth home service end authentication sub-procedure G is defined as, when the home service end is the home cloud 3a, and the foreign service end is a foreign cloud 3b or a foreign fog 5b using OIDC, the authentication procedure performed by the control module 21 and the home cloud 3a (the details can be seen with reference to FIG. 14), After executing step S302, step S303(a) is executed, in which the control module 21 provides an identity token to the vIdP 22. and then step S303(b) is executed, in which the control module 21 controls the vIdP 22 to send the identity token to the foreign cloud 3b (or foreign fog 5b), while the foreign cloud 3b (or foreign fog 5b) may grant access right to the account of the home cloud 3a through the identity token and thus provide services. As a result, cloud-to-cloud/fog(OIDC) authentication is completed.

When the login option is the home edge 4a, step S304 is executed, in which the control module performs the first home service end authentication sub-procedure A. When step S304 is completed, steps S305(a)~S305(c) are executed, in which the control module 21 creates an identity token and controls vIdP 22 to send the identity token to the foreign cloud 3b (or the foreign fog 5b), and the foreign cloud 3b (or the foreign fog 5b) may grant access right to the account of the home edge 4a through the identity token, As a result, the edge-to-cloud/fog(OIDC) authentication is completed.

When the login option is the home fog 5a, step S306 is executed, in which the control module determines whether the communication protocol of the home fog 5a is 802.1x or not.

If the communication protocol of the home fog 5a is not 802.1x but OIDC, step S307 is executed, in which the control module 21 performs a sixth home service end authentication sub-procedure H. The sixth home service end authentication sub-procedure H is defined as, when the home service end is the fog 5a using OIDC, and the foreign service end is a foreign cloud 3b or a foreign fog 5b using OIDC, the authentication procedure required to be performed by the control module 21 and the home fog 5a (the details can be seen with reference to FIG. 15). When completing the sixth home service end authentication sub-procedure H, the fog(OIDC)-to-cloud/fog(OIDC) authentication is completed.

If the communication protocol of the home fog 5a is 802.1x, step S308 is executed, in which the control module 21 performs the third home service end authentication sub-procedure D. After the third home service end authentication sub-procedure D, steps S309(a)~S309(c) are executed, in which the control module 21 creates an identity token and controls the vIdP 22 to send the identity token to the foreign cloud 3b (or foreign fog 5b), and the foreign cloud 3b (or the foreign fog 5b) may grant access right to the account of the home fog 5a through the identity token. As a result, the fog(802.1x)-to-cloud/fog(OIDC) authentication is completed.

Accordingly, the details of the third user authentication procedure can be understood.

In addition, in order to make the description clearer, the cross-border services applicable to the first home service end authentication sub-procedure A to the sixth home service end authentication sub-procedure H are listed below.

The first home service end authentication sub-procedure A can be applied to cross-border services such as edge-to-fog(802.1x), edge-to-cloud and edge-to-fog(OIDC), but is not limited to this.

The first foreign service end authentication sub-procedure B can be applied to cross-border services such as edge-to-fog(802.1x), cloud-to-fog(802.1x), fog(OIDC)-to-fog (802.1x) and fog(802.1x)-to-fog(802.1x), and is not limited to this.

The second home service end authentication sub-procedure C can be applied to cross-border services such as cloud-to-fog(802.1x) and fog(OIDC)-to-fog(802.1x), and is not limited to this.

The third home service end authentication sub-procedure D can be applied to cross-border services such as fog (802.1x)-to-fog(802.1x), fog(802.1x)-to-fog(OIDC), fog (802.1x)-to-edge and fog(802.1x)-to-cloud, and is not limited to this.

The second foreign service end authentication sub-procedure E can be applied to cross-border services such as edge-to-edge, and is not limited to this.

The fourth home service end authentication sub-procedure F can be applied to cross-border services such as cloud-to-edge and fog(OIDC)-to-edge, and is not limited to this.

The fifth home service end authentication sub-procedure G can be applied to cross-border services such as cloud-to-cloud and cloud-to-fog(OIDC), and is not limited to this.

The sixth home service end authentication sub-procedure H can be applied to cross-border services such as fog (OIDC)-to-cloud and fog(OIDC)-to-fog(OIDC), and is not limited to this.

Next, the details of the application of the first home service end authentication sub-procedure A to the sixth home service end authentication sub-procedure H are given. It should be noted again that, in the following steps of the process, the step of forwarding the message at the relay may be omitted but, in fact, messages are forwarded through the relays between each service end and the universal proxy 2.

Figure 8:
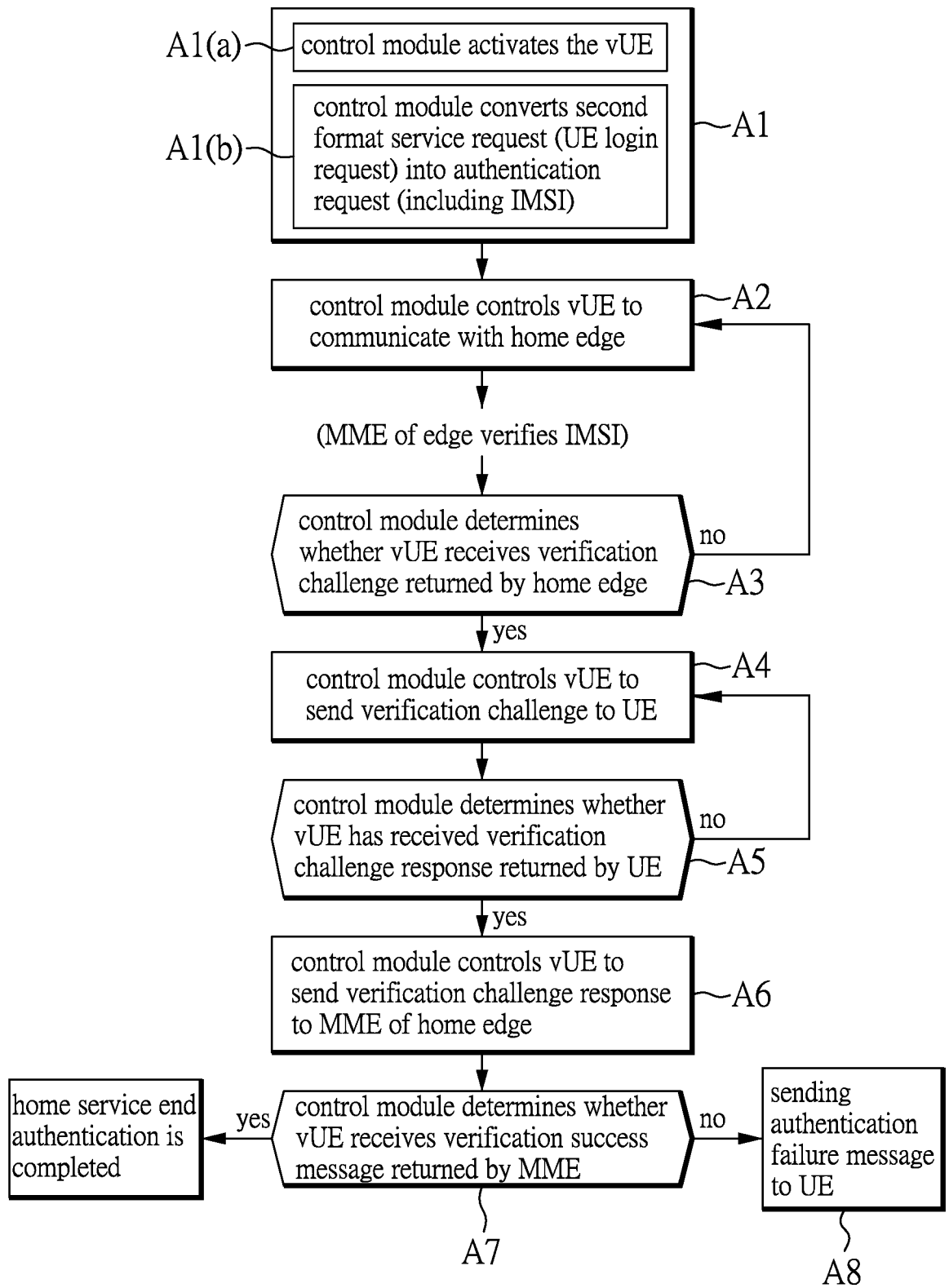
FIG. 8 is a flowchart illustrating the steps of the first home service end authentication sub-procedure according to an embodiment of the present disclosure.

The first home service end authentication sub-procedure A will be explained first. FIG. 8 is a flowchart illustrating the steps of the first home service end authentication sub-procedure A according to an embodiment of the present disclosure, and please refer to FIG. 1 to FIG. 7 at the same time.

As shown in FIG. 8, step A1(a) is executed first, in which the control module 21 activates the vUE 23, and then step A1(b) is executed, in which the control module 21 converts the second format service request (UE login request) from the user equipment 6 into an authentication request. In one embodiment, the second format service request may include an international mobile subscriber identity (IMSI) of the user equipment 6, and the converted authentication request also includes IMSI information. Since the IMSI is provided by the home service end, the home service end may identify whether the IMSI is legal.

Then, step A2 is executed, ire which the control module 21 controls the vUE 23 to communicate with the home edge 4a, and sends an authentication request to the home edge 4a. In one embodiment, when the home edge 4a receives the authentication request, it may immediately identify whether the authentication request IMSI is legal or not. When the IMSI is confirmed to be legal, the HSS of the home edge 4a may generate an authentication request response, and the MME of the home edge 4a may convert the authentication request response into a verification challenge for being sent back to the vUE 23. In one embodiment, the authentication request response may include an authentication vector, and the authentication vector may include an expected response (XRES), an authentication value (AUTN), a random number (RAND), and a session key ($K_{asme}$). The verification challenge may include an expected response (XRES), authentication value (AUTN), and a random number (RAND), but it is not limited thereto.

Then, step A3 is executed, in which the control module 21 determines whether the vUE 23 receives the verification challenge returned by the home edge 4a. If it is not received, step A2 is executed again. If it is received, step A4 is executed, in which the control module 21 controls the vUE 23 to send the verification challenge to the user equipment 6. In one embodiment, the user equipment 6 may perform the EPS-AKA verification process according to the verification challenge, for example, generate a verification challenge response.

Then, step A5 is executed, in which the control module 21 determines whether the vUE 23 has received the verification challenge response returned by the user equipment 6. If it is not received, step A4 is executed again. If it is received, step A6 is executed, in which the control module 21 controls the vUE 23 to send a verification challenge response to the MME of the home edge 4a. The MME may determine whether the verification challenge response is correct or not. When the verification challenge response is correct, the edge 4a may return a verification success message.

Therefore, step A7 is executed, in which the control module 21 determines whether the vUE 23 receives the verification success message returned by the MME. If it is received, the first home service end authentication sub-procedure A is completed. That is, the authentication required by the home edge 4a has been completed, and then it may perform the authentication required by the foreign service end, for example, generate an identity token required by a foreign cloud 3b or a foreign fog(OIDC) 5b or perform the first foreign service end authentication sub-procedure B required for the foreign fog(802.1x) 5b. If it is not received, step A8 is executed, in which the universal proxy 2 sends an authentication failure message to the user equipment 6, and stops the operation.

As a result, the details of the first home service end authentication sub-procedure A can be understood.

Figure 9:
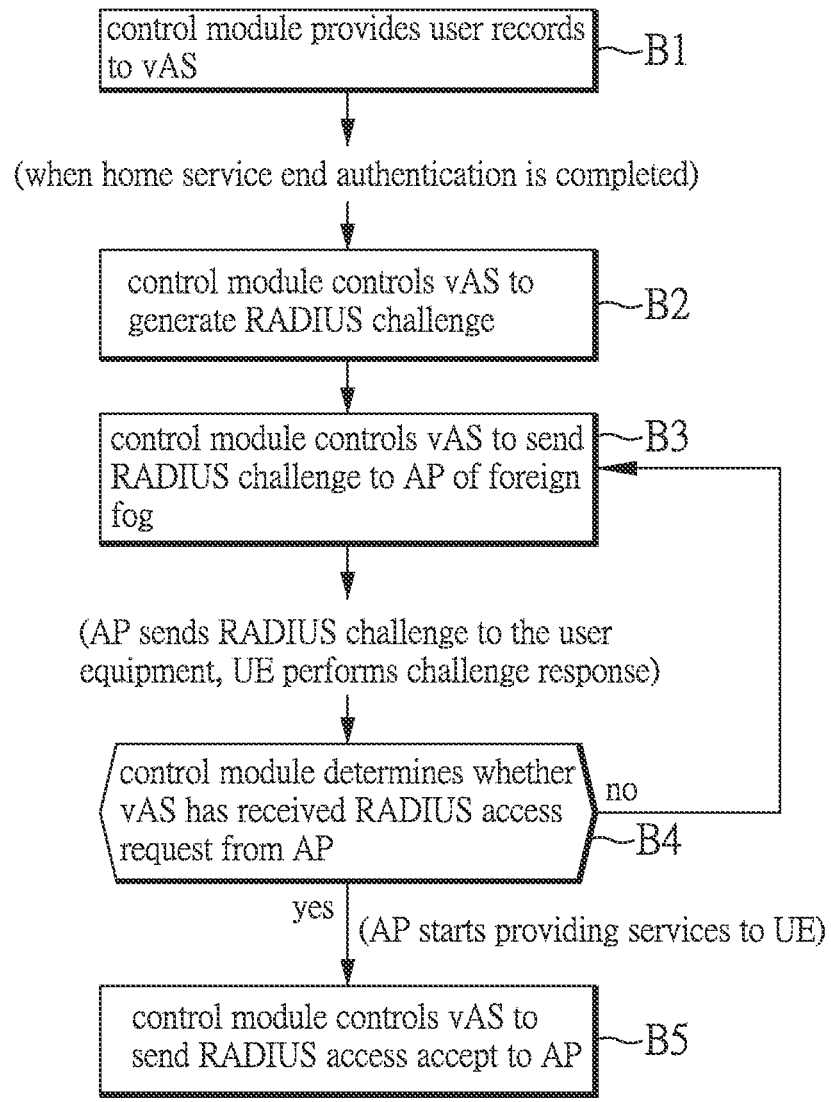
FIG. 9 is a flowchart illustrating the steps of the first foreign service end authentication sub-procedure according to an embodiment of the present disclosure.

Next, the details of the first foreign service end authentication sub-procedure B will be explained. FIG. 9 is a flowchart illustrating the steps of the first foreign service end authentication sub-procedure B according to an embodiment of the present disclosure, and please refer to FIG. 1 to FIG. 7 at the same time.

As shown FIG. 9, step B1 is executed first, in which the control module 21 provides user records to the vAS 28, and the user records may include data such as users credentials. Then, step B2 is executed, in which, when the home service end authentication is completed, the control module 21 controls the vAS 28 to generate a remote authentication dial in user service access challenge (hereinafter abbreviated as RADIUS challenge).

Then, step B3 is executed, in which the control module 21 controls the vAS 28 to send the RADIUS challenge to the access point (AP) of the foreign fog 5b (802.1x). When the access point receives the RADIUS challenge, the access point may convert the RADIUS challenge into an extensible authentication protocol request/Message-Digest Algorithm 5 (hereinafter abbreviated as EAP-req/MD5) required for 802.1x authentication which is then sent to the user equipment 6. According to the RADIUS challenge, the user equipment 6 may generate an extensible authentication protocol response/Message-Digest Algorithm 5 (hereinafter abbreviated as EAP-res/MD5) which is then send back to the access point. When the access point receives EAP-res/MD5 and confirms that it is correct, it may convert EAP-res/MD5 into a remote authentication dial in user service access request (hereinafter abbreviated as RADIUS access request) which is then sent to the vAS 28 of the universal proxy 2.

Next, step B4 is executed, in which the control module 21 determines whether the vAS 28 has received the RADIUS access request from AP. If it is not received, step B3 is executed again. If it is received, step B5 is executed, in which the control module 21 controls the vAS 28 to return a remote authentication dial in user service access accept (hereinafter referred to as RADIUS access accept) to the access point.

It should be noted that, when the access point (AP) receives the RADIUS access accept, the access point may send an extensible authentication protocol success (EAP-success) to the user equipment 6, and the foreign fog (802.1x) 5b may immediately provide services to the user equipment 6 according to EAP-success.

As a result, the details of the first foreign service end authentication sub-procedure B can be understood.

Figure 10:
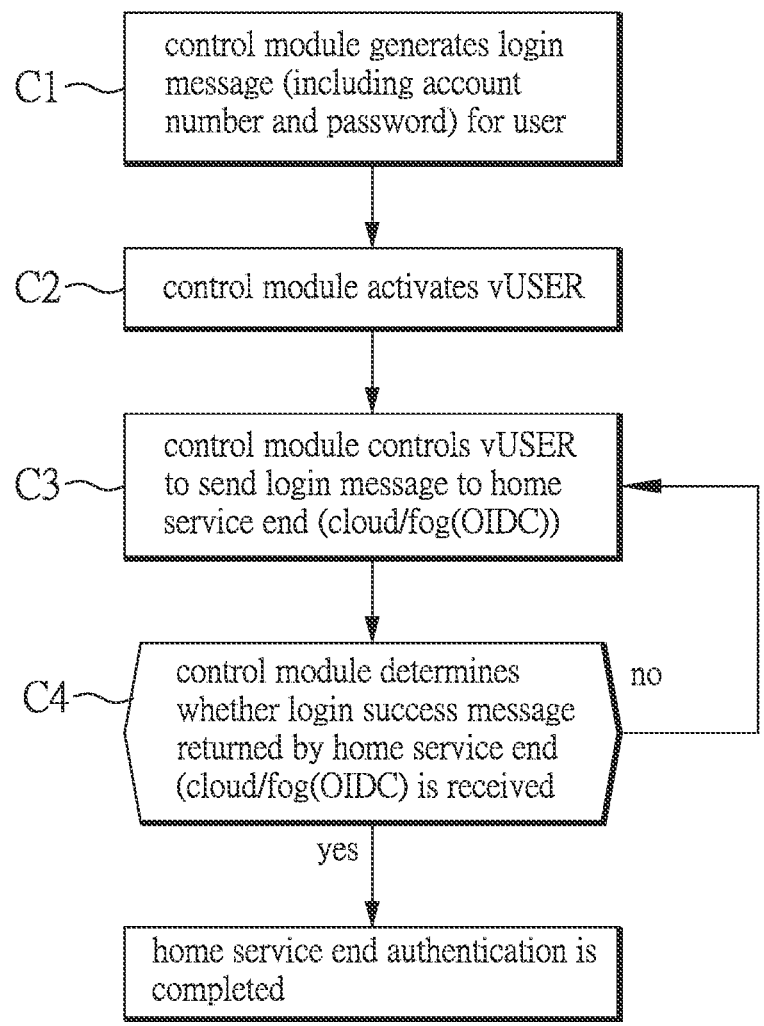
FIG. 10 is a flowchart illustrating the steps of the second home service end authentication sub-procedure according to an embodiment of the present disclosure.

Next, the details of the second home service end authentication sub-procedure C will be explained. FIG. 10 is a flowchart illustrating the steps of the second home service end authentication sub-procedure C according to an embodiment of the present disclosure, and please refer to FIGS. 1 to 9 at the same time.

As shown in FIG. 10, step C1 is executed, in which the control module 21 generates a login message (including the account number and password) for an account of the home cloud 3a or the home fog(OIDC) 5a, wherein the information of the account and password may be from the service request or the authentication request previously sent by the user equipment 6, but is not limited to this.

Then, step C2 is executed, in which the control module 21 activates the vUSER 26. Then, step C3 is executed, in which the control module 21 controls the vUSER 26 to send a login message to the home cloud 3a or the home fog(OIDC) 5a, and verify whether the account number and password are correct through the home cloud 3a or the home fog(OIDC) 5a.

Then, step C4 is executed, in which the control module 21 determines whether the vUSER 26 has received a login success message returned by the home cloud 3a or the home fog(OIDC) 5a. If it is not received, step C3 is executed again. If it is received, the second home service end authentication sub-procedure C is completed, and then the authentication required by the foreign service end can be performed, such as the first foreign service end authentication sub-procedure B.

As a result, the second home service end authentication sub-procedure C can be understood.

Next, the details of the third home service end authentication sub-procedure D will be explained. FIG. 11 is a flowchart illustrating the steps of the third home service end authentication sub-procedure D according to an embodiment of the present disclosure, and please refer to FIGS. 1 to 10 at the same time.

As shown in FIG. 11, step D1 is executed first, in which the control module 21 activates vUSER 26.

Then, step D2 is executed, the control module 21 controls the vUSER 26 to send an extensible authentication protocol over local area network start request (EAPOL start request) to the AS of the home fog(802.1x) 5a.

Then, step D3 is executed, in which the control module 21 determines whether the universal proxy 2 has received an extensible authentication protocol request(identity) (EAP-req/ID) returned by the home fog (802.1x) 5a.

If the EAP-req/ID is not received, step D2 is executed again. If the EAP-req/ID is received, step D4 is executed, in which the control module 21 controls the universal proxy 2 to send the EAP-req/ID to the user equipment 6.

Next, step D5 is executed, in which the control module 21 determines whether the universal proxy 2 has received an extensible authentication protocol(identity) response (EAP-res/ID) returned by the user equipment 6.

If the EAP-res/ID is not received, step D4 is executed again. If EAP-res/ID is received, step D6 is executed, in which the control module 21 controls the universal proxy 2 to send the EAP-res/ID to the AS of the home fog (802.1x) 5a.

Then, step D7 is executed, in which the control module 21 determines whether the universal proxy 2 has received the EAP-req/MD5 returned by the AS of the home fog 5a (802.1x).

If EAP-req/MD5 is not received, step D6 is executed again. If EAP-req/MD5 is received, step D8 is executed, in which the universal proxy 2 sends EAP-req/MD5 to the user equipment 6.

Next, step D9 is executed, in which the control module 21 determines whether the universal proxy 2 has received the EAP-res/MD5 returned by the user equipment 6.

If EAP-res/MD5 is not received, step D8 is executed again. If EAP-res/MD5 is received, step D10 is executed, in which the control module 21 controls the universal proxy 2 to send EAP-res/MD5 to the AS.

Then, step D11 is executed, and the control module 21 determines whether the universal proxy 2 has received the EAP-success returned by the AS.

If EAP-success is not received, step D13 is executed, in which the control module 21 controls the universal proxy 2 to send an EAP authentication failure message to the user equipment 6, and stops the operation. If EAP-success is received, the third home service end authentication sub-procedure D is completed (step D12). That is, the authentication required by the home fog 5a (802.1x) has been completed, and then the authentication required by the foreign service end may be performed, for example, the first foreign service end authentication sub-procedure B, EPS-AKA authentication, identity token, etc. As a result, the details of the third home service end authentication sub-procedure D can be understood.

Figure 12:
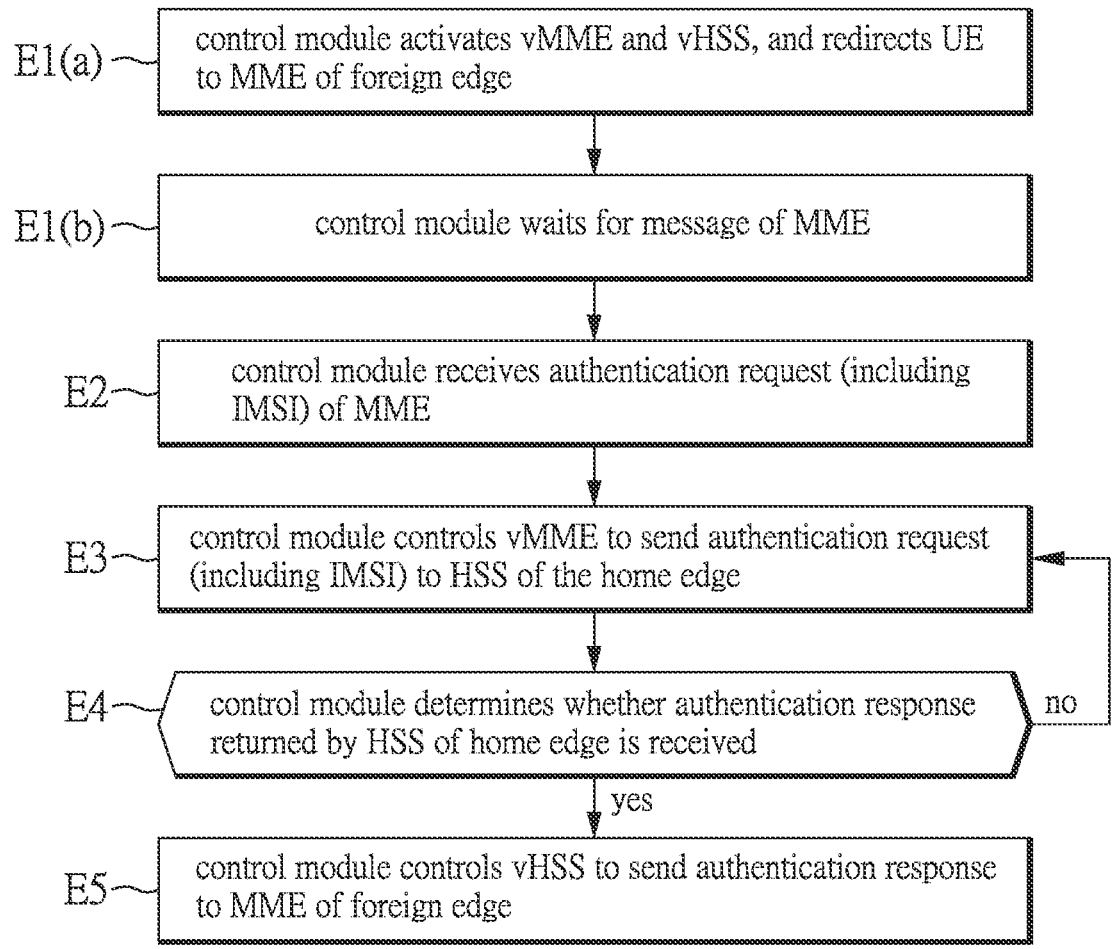
FIG. 12 is a flowchart illustrating the steps of the second foreign service end authentication sub-procedure according to an embodiment of the present disclosure.

Next, the details of the second foreign service end authentication sub-procedure E will be described. FIG. 12 is a flowchart illustrating the steps of the second foreign service end authentication sub-procedure E according to an embodiment of the present disclosure, and please refer to FIGS. 1 to 11 at the same time.

As shown in FIG. 12, step E1(a) is executed first, in which the control module 21 activates the vMME 24 and vHSS 27, and redirects (e.g. reconnects) the user equipment 6 to the MME of the foreign edge 4b. Then, step E1(b) is executed, in which the control module 21 waits for the message sent by the MME.

Then, step E2 is executed, in which the control module 21 receives the authentication request (including the IMSI) sent by the MME, where the authentication request may be, for example, a service request sent from the user equipment 6.

Then, step E3 is executed, in which the control module 21 controls the vMME 24 to send an authentication request to the HSS of the home edge 5a to confirm whether the IMSI is legal. When the IMSI is legal, the home edge 5a may immediately generate the authentication vector required for EPS-AKA authentication, and return an authentication response including the authentication vector.

Then, step E4 is executed, in which the control module 21 determines whether the universal proxy 2 receives the authentication response returned by the home edge 5a.

If it is not received, step E3 is executed again. If it is received, step E5 is executed, in which the control module 21 controls the vHSS 27 to send the authentication response to the MME of the foreign edge 5b.

In one embodiment, when the MME of the foreign edge 5b receives the authentication response, it may generate an authentication challenge to the user equipment 6 according to the authentication vector. When the user equipment 6 returns a correct authentication challenge response, the foreign edge 5b may immediately provide services to the user equipment 6.

As a result, the second foreign service end authentication sub-procedure E can be understood.

Figure 13:
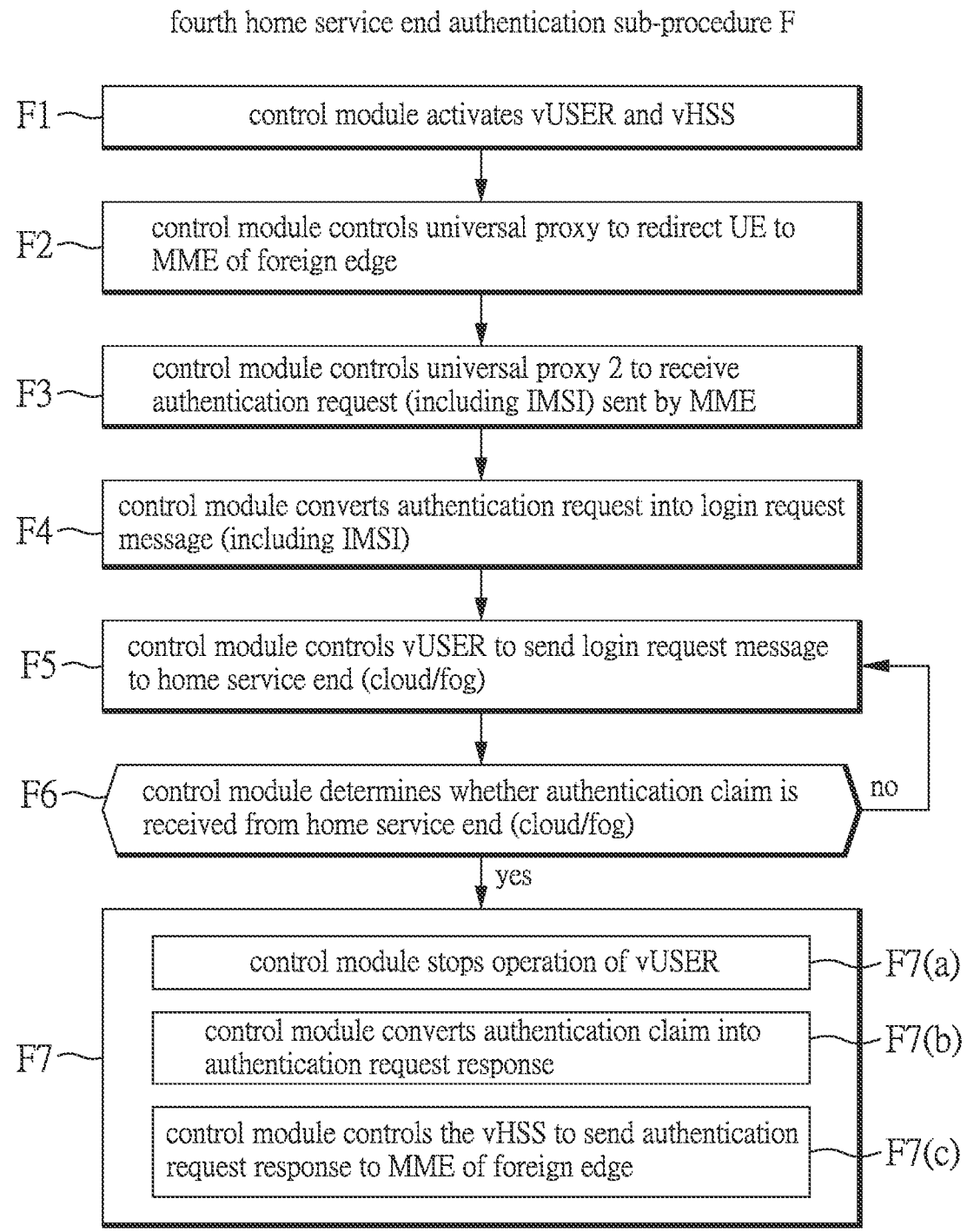
FIG. 13 is a flowchart illustrating the steps of the fourth home service end authentication sub-procedure according to an embodiment of the present disclosure.

Next, the details of the fourth home service end authentication sub-procedure F will be explained. FIG. 13 is a flowchart illustrating the steps of the fourth home service end authentication sub-procedure F according to an embodiment of the present disclosure, and please refer to FIGS. 1 to 12 at the same time.

As shown in FIG. 13, step F1 is executed. first, in which, when the user equipment 6 selects the home cloud 3a or the home fog 5a (OIDC) as the login option, the control module 21 activates the vUSER 26 and vHSS 27.

Then, step F2 is executed, in which the universal proxy 2 redirects the user equipment 6 to the MME of the foreign edge 4b. After that, the user equipment 6 may send a connection request with IMSI to the MME of the foreign edge 4b, and the MME of the foreign edge 4b may convert the connection request into a verification request with IMSI information, and send the verification request to universal proxy 2.

Then, steps F3 and F4 are executed, the universal proxy 2 receives the authentication request sent by the MME, and the control module 21 converts the authentication request into general website login message readable to the home cloud 3a or home fog 5a (OIDC) (for example, the mechanism of logging in with an account number and password).

Then, step F5 is executed, in which the control module 21 controls the vUSER 26 to send the general website login message to the home cloud 3a or the home fog 5a (OIDC). in one embodiment, the home cloud 3a or the home fog 5a (OIDC) will verify whether the account number and password are correct and, if correct, an authentication claim including the authentication vector will be returned; otherwise, the operation stops.

Therefore, step F6 is executed, ire which the control module 21 determines whether the universal proxy 2 has received the authentication claim.

If it is not received, step F5 is executed again. If it is received, steps F7(a)~F7(c) are executed, in which the control module 21 stops the operation of vUSER 26 and converts the authentication claim into an authentication request response including the authentication vector for use as a response to the authentication request sent by the MME of the foreign edge 4b in step F3, and controls the vHSS 27 to send the authentication request response to the MME of the foreign edge 4b. After that, when the MME of the foreign edge 4b receives the authentication request response, the foreign edge 4b itself may perform EPS-AKA authentication on the user equipment 6 according to the authentication vector, and determine whether to provide services to the user equipment 6 according to the authentication result.

As a result, the details of the fourth home service end authentication sub-procedure F can be understood.

Figure 14:
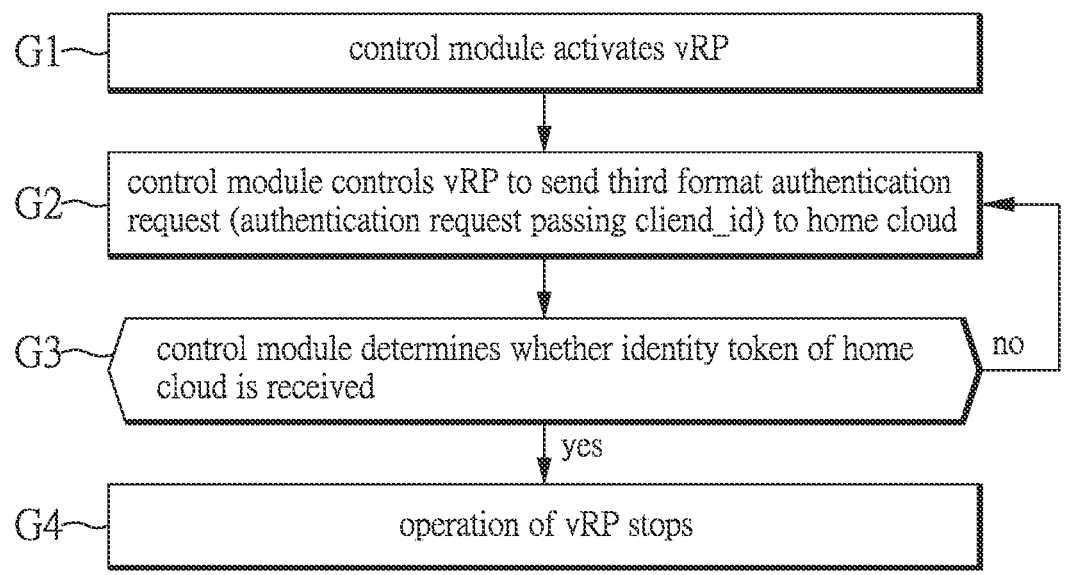
FIG. 14 is a flowchart illustrating the steps of the fifth home service end authentication sub-procedure according to an embodiment of the present disclosure.

Next, the details of the fifth home service end authentication sub-procedure G will be explained. FIG. 14 is a flowchart illustrating the steps of the fifth home service end authentication sub-procedure G according to an embodiment of the present disclosure, and please refer to FIGS. 1 to 13 at the same time.

As shown in FIG. 14, step (31 is executed first, in which, when the foreign service end is the foreign cloud 3b or the foreign fog 5b (OIDC), and the user equipment 6 selects to use the home cloud 3a as the login option, the control module 21 activates vRP 25.

Then, step G2 is executed, in which the control module 21 controls the vRP 25 to send the third format authentication request to the home cloud 3a. Since the home cloud 3a and the foreign cloud 3b (or the foreign fog 5b) both use OIDC, the home cloud 3a may directly read the third format authentication request and, when the home service end determines the user information in the third format authentication request is correct, an identity token is returned.

Then, step G3 is executed, in which the control module 21 determines whether the universal proxy 2 has received the identity token sent by the home cloud 3a.

If it is not received, step G2 is executed again. If it is received, step G4 is executed, in which the control module 21 stops the operation of the vRP 25, and controls the universal proxy 2 to send the identity token to the foreign cloud 3a or the foreign fog 5a (OIDC). After that, the foreign cloud 3a or the foreign fog 5a. (OIDC) may determine whether to provide services to the user equipment 6 according to the identity token.

As a result, the details of the fifth home service end authentication sub-procedure G can be understood.

Figure 15:
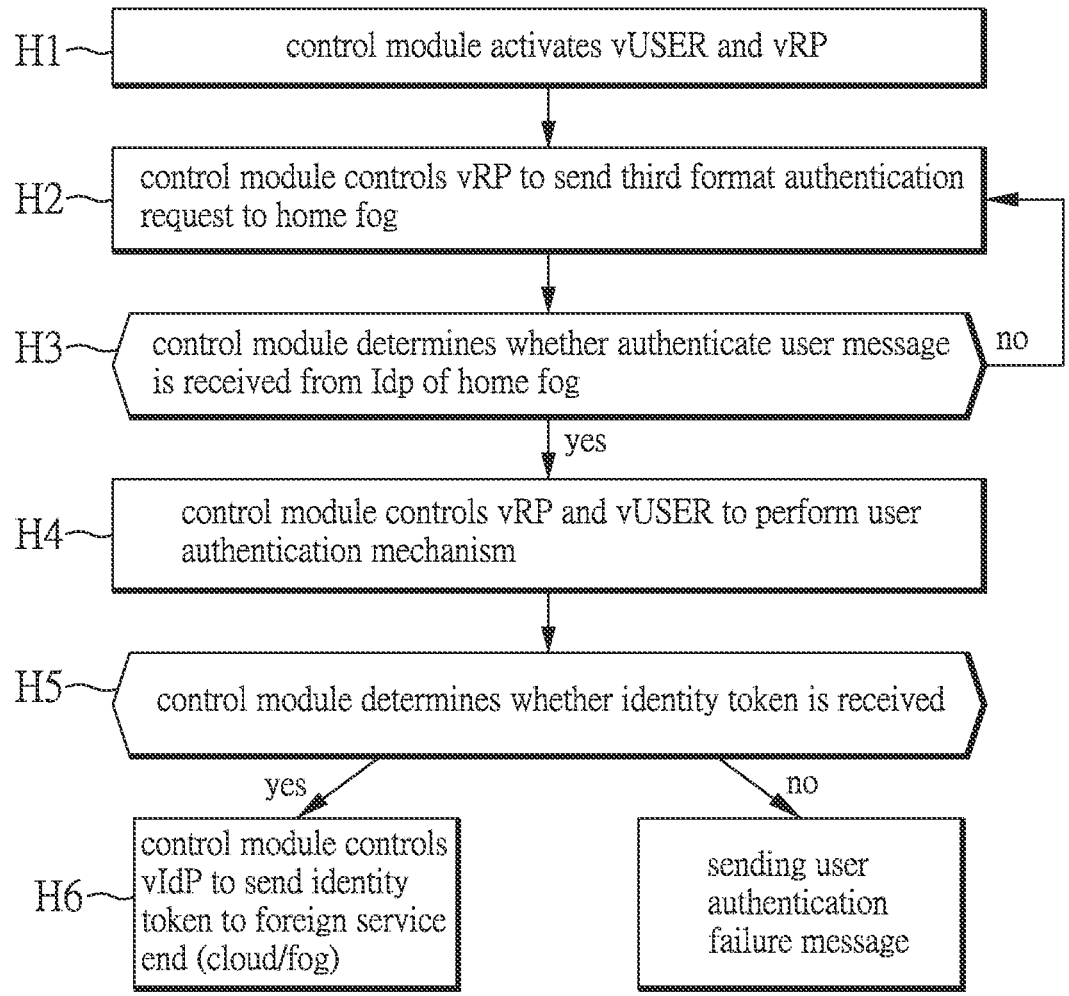
FIG. 15 is a flowchart illustrating the steps of the sixth home service end authentication sub-procedure according to an embodiment of the present disclosure.

Next, the details of the sixth home service end authentication sub-procedure H will be explained. FIG. 15 is a flowchart illustrating the steps of the sixth home service end authentication sub-procedure H according to an embodiment of the present disclosure, and please refer to FIGS. 1 to 14 at the same time.

As shown in FIG. 15, step H1 is executed first, in which, when the foreign service end is the foreign cloud 3b or the foreign fog 5b (OIDC), and the user equipment 6 selects the home fog 5a (OIDC) as the login option, the control module 21 activates vUSER 26 and vRP 25.

Then, step H2 is executed, in which the control module 21 controls the vRP 25 to send the third format authentication request to the home fog 5a (OIDC). Since the home fog 5a and the foreign cloud 3b (or foreign fog 5b) both use OIDC, the home fog 5a may directly read the third format authentication request and, when the home fog 5a determines that the user information in the third format authentication request is correct, the IdP of the home fog 5a may return an authenticate user message.

Then, step H3 is executed, in which the control module 21 determines whether the authenticate user message is received.

If it is not received, step H2 is executed again. If it is received, step H4 is executed, in which the control module 21 controls vRP 25 and vUSER 26 to perform a user authentication mechanism with the user equipment 6 and the Idp of the home fog 5a. For example, vRP 25 will send the third format service request (auth request passing client_id) to the Idp of the home fog 5a, and authenticate the user with the assistance of vUSER 26, thereby providing an ID token according to the authentication result. Therefore, when the user authentication mechanism is completed (for example, the authentication is successful), the Idp of the home fog 5a will send the identity token to the universal proxy 2.

Next, step H5 is executed, in which the control module 21 determines whether the universal proxy 2 has received the identity token.

If it is not received, the control module 21 notifies the user equipment that the authentication fails. If it is received, step H6 is executed, in which the control module 21 controls the vIdP 22 to send the identity token to the foreign cloud 3b or the foreign fog 5b (OIDC). After that, the foreign cloud 3b or the foreign fog 5b (OIDC) may determine whether to provide services to the user equipment 6 according to the identity token.

As a result, the sixth home service end authentication sub-procedure H can be understood.

In addition, the universal proxy 2 may establish a forwarding table according to the logic flow to determine which operation modules 22-28 need to be activated and which mappings need to be completed under various cross-border authentication conditions.

The logic flow and forwarding table are described as follows.

In one embodiment, the logic flow starts with the connection between the universal proxy 2 and the relays. Next, the universal proxy 2 must find out the identities of the home relay and the foreign relay. If the home relay is the fog relay 9a, the control module 21 must determine whether the communication protocol used by the home fog 5a is OIDC and, if not, activate vUSER 36 to correspond to the home fog 5a. If the home relay is the cloud relay 7a, the control module 21 determines to activate the vUSER 26 or vRP 25 according to the identity of the foreign relay so as to correspond to the home cloud 3a. If the home relay is the edge relay 8a, the control module 21 will determine to activate the NAME 24 or vUE 23 according to the identity of the foreign relay so as to correspond to the home edge 4a.

The control module 21 must also determine the identity of the foreign relay. If the foreign relay is the edge relay 8b, the control module 21 activates the OBS 27 to correspond to the foreign edge 4b. If the foreign relay is the cloud relay 7b, the control module 21 activates the vIdP 22 to correspond to the foreign cloud 3b. If the foreign relay is the fog 9b, the control module 21 must determine whether the foreign fog 5b uses OIDC, and activate vIdP 22 to correspond to the foreign fog 5b if yes, or activate vAS 28 if no.

In addition, the control module 21 must also determine the mapping to be performed so as to convert the message from one communication protocol to another communication protocol. For example, in the case of edge-to-cloud, the universal proxy 2 may perform the mapping between 3GPP EPS-AKA and OIDC by converting the "Login with IMSI" message to the "Auth Request (IMSI)" message, thereby communicating with the edge.

FIG. 16 schematically illustrating the forwarding table of the universal proxy 2 according to an embodiment of the present disclosure. Through the forwarding table, the control module 21 may quickly get the operation modules 22~28 required to be activated for various cross-border authentications and the mappings required to be performed.

In addition, in one embodiment, the function of the universal proxy 2 may be expanded to respond to newly added communication protocols. When a new communication protocol is added, the logic flow and forwarding table of the universal proxy 2 can be adjusted accordingly. As a result, the details of the logic flow and the forwarding table can be known.

Figure 17:
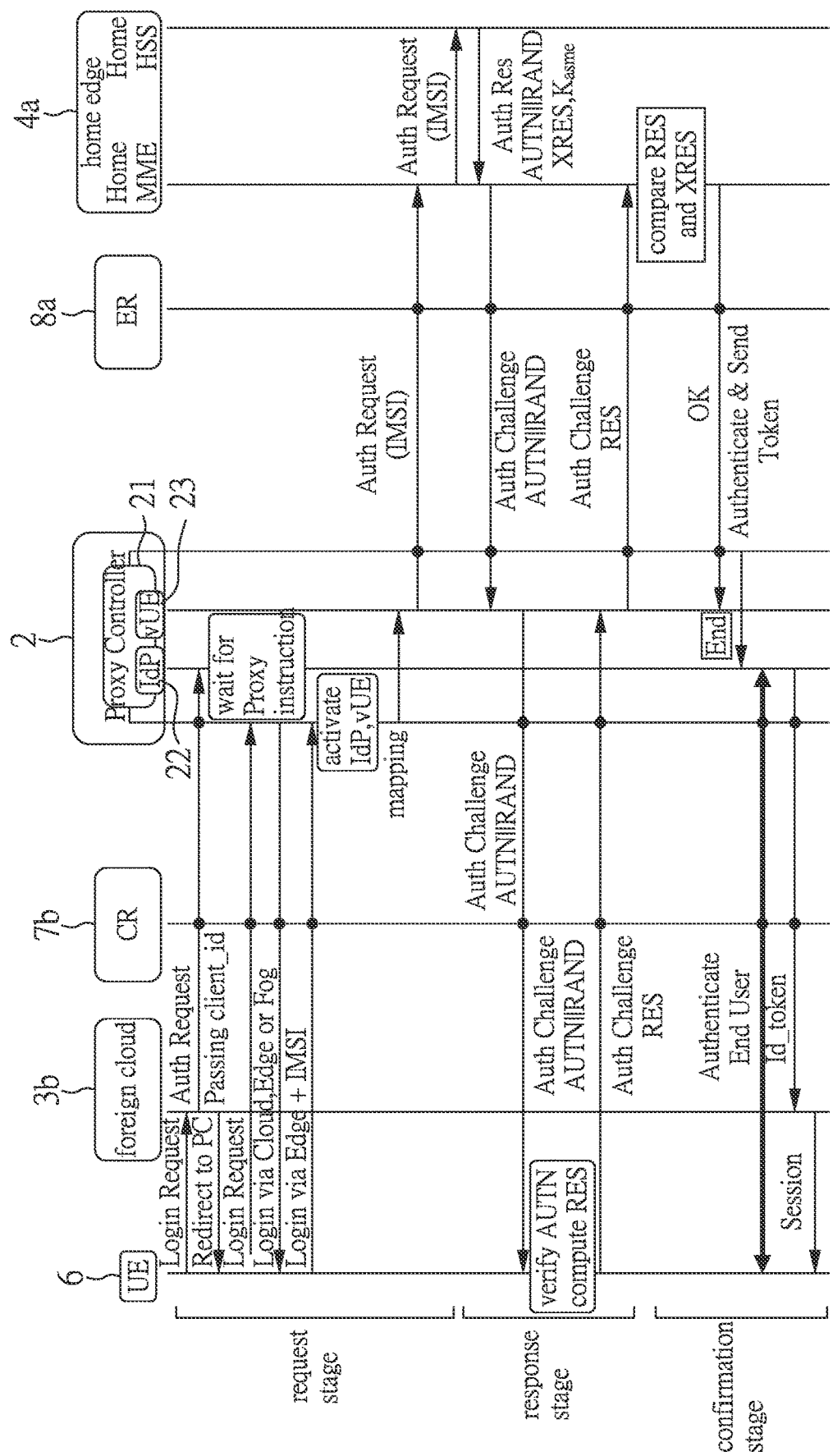
FIG. 17 schematically illustrates the transmission of an edge-to-cloud authentication process according to an embodiment of the present disclosure.
Figure 18:
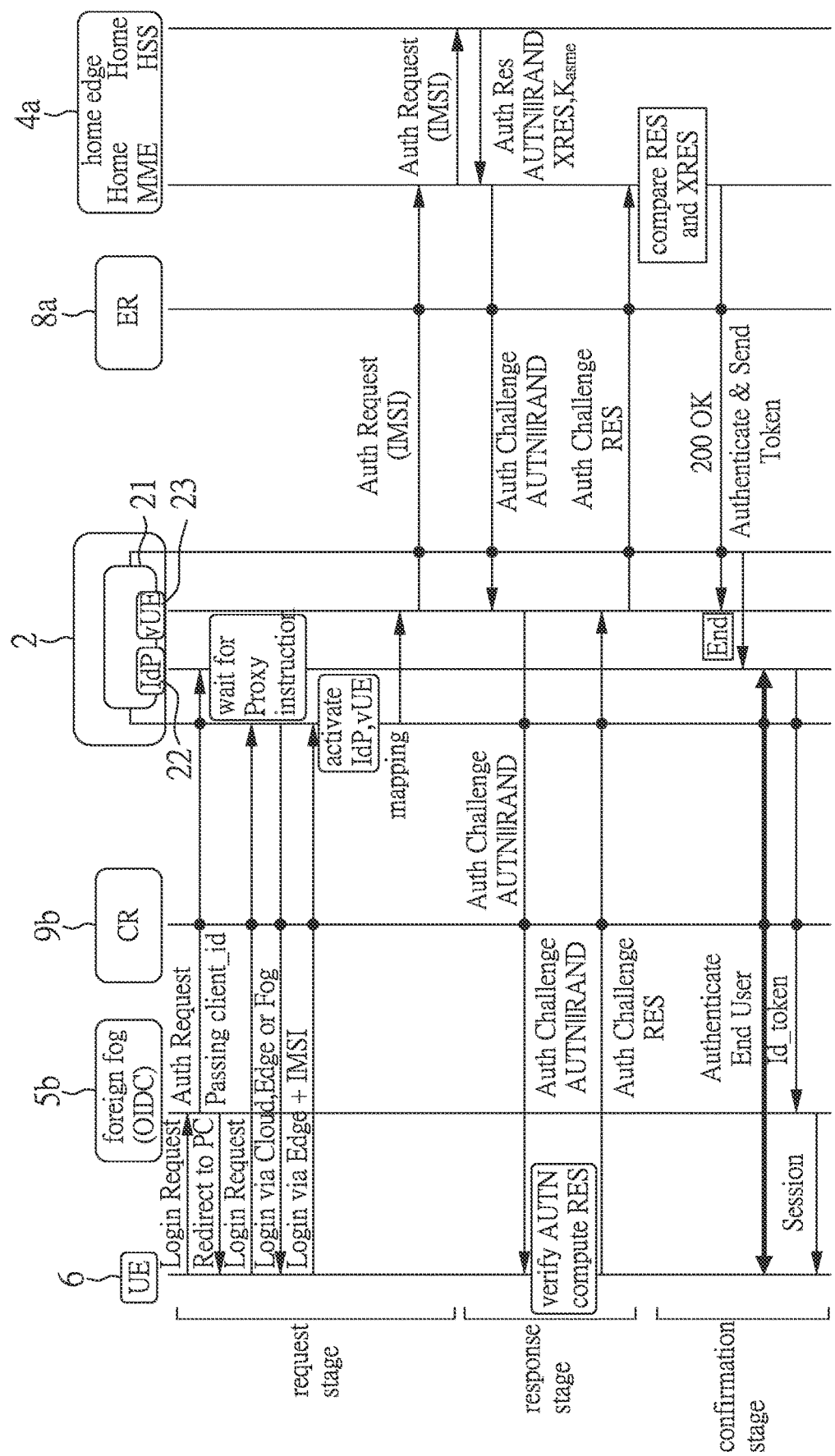
FIG. 18 schematically illustrates the transmission of an edge-to-fog(OIDC) authentication process according to an embodiment of the present disclosure.
Figure 19:
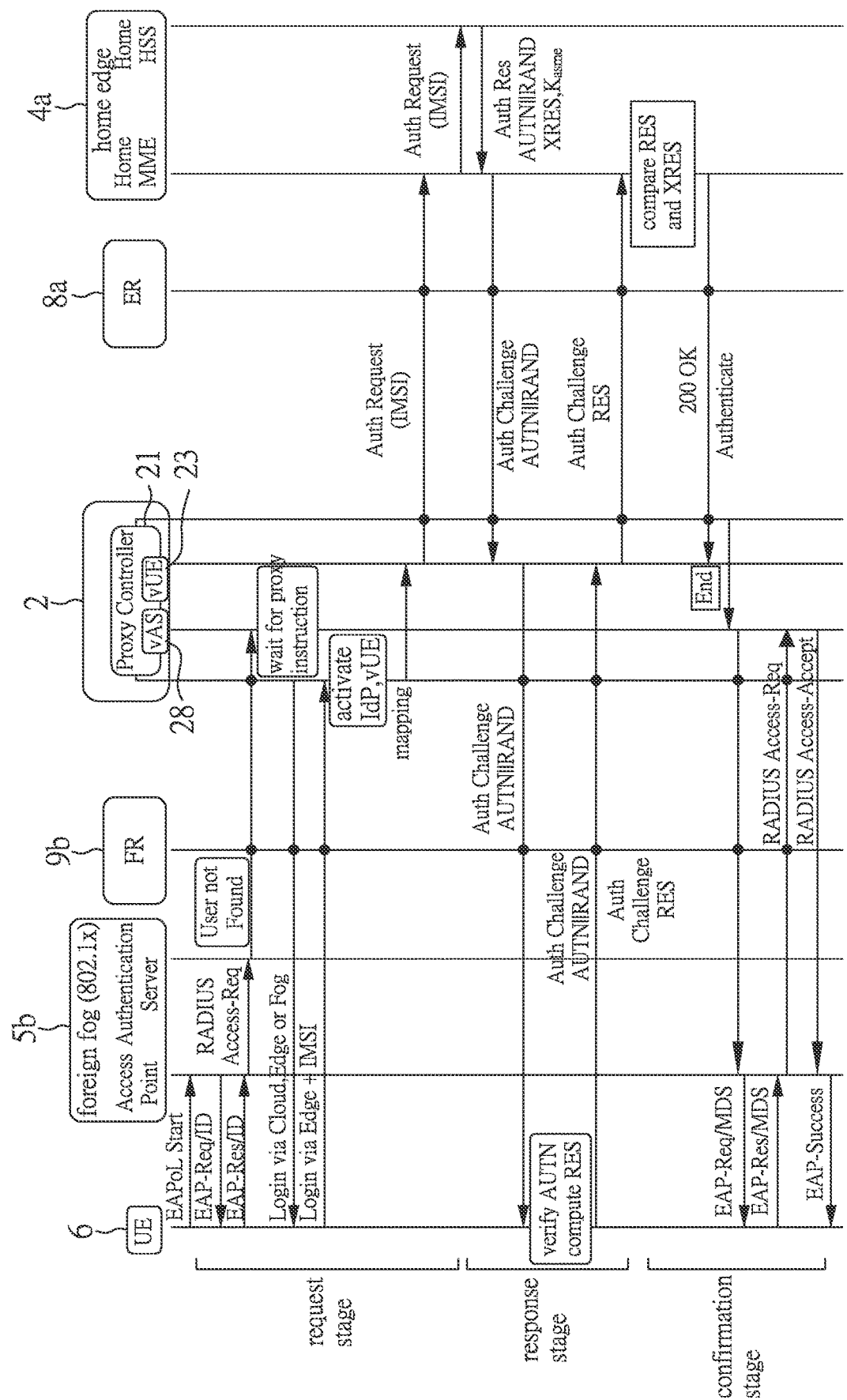
FIG. 19 schematically illustrates the transmission of an edge-to-fog(802.1x) authentication process according to an embodiment of the present disclosure.
Figure 20:
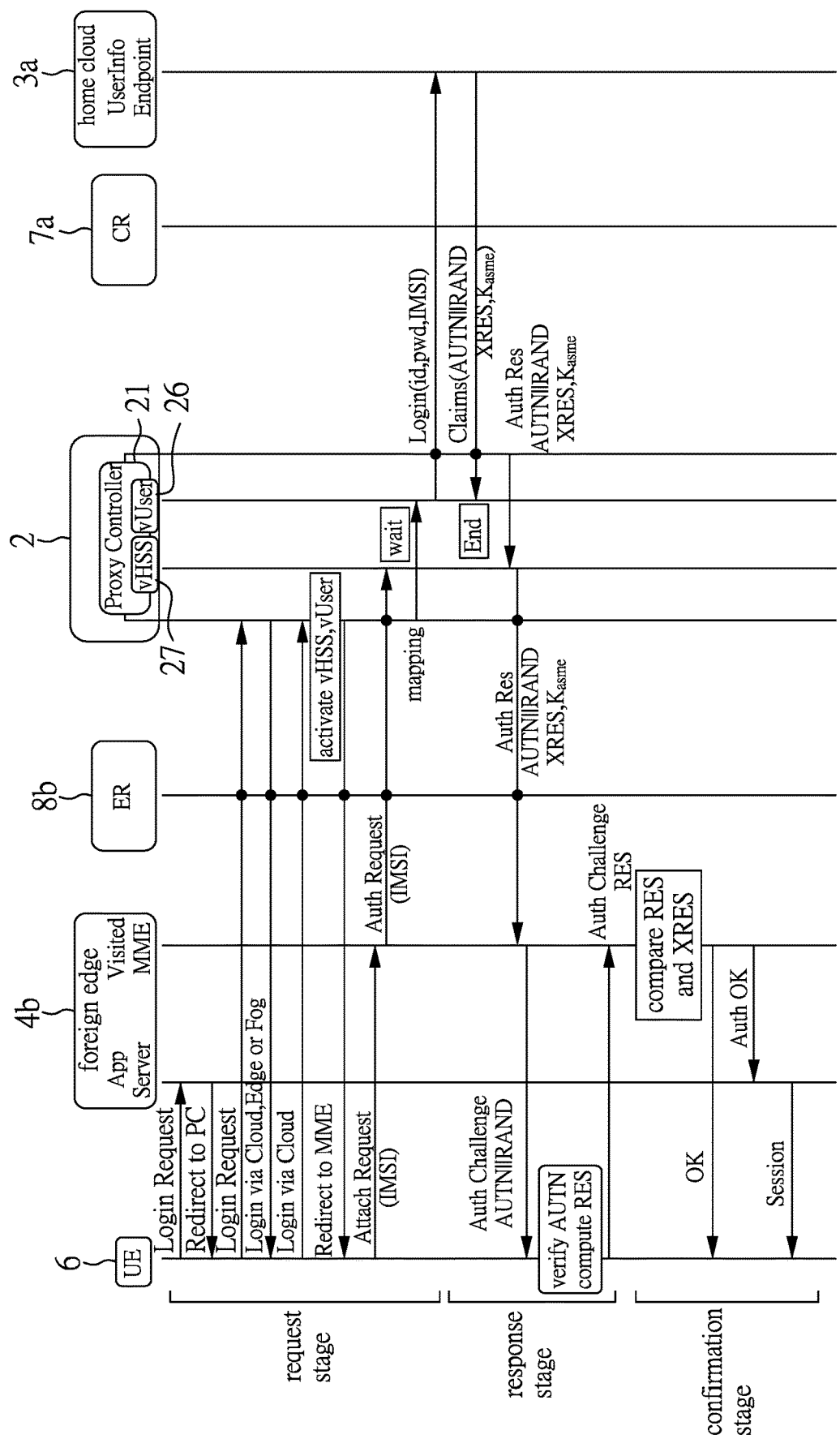
FIG. 20 schematically illustrates the transmission of a cloud-to-edge authentication process according to an embodiment of the present disclosure.
Figure 21:
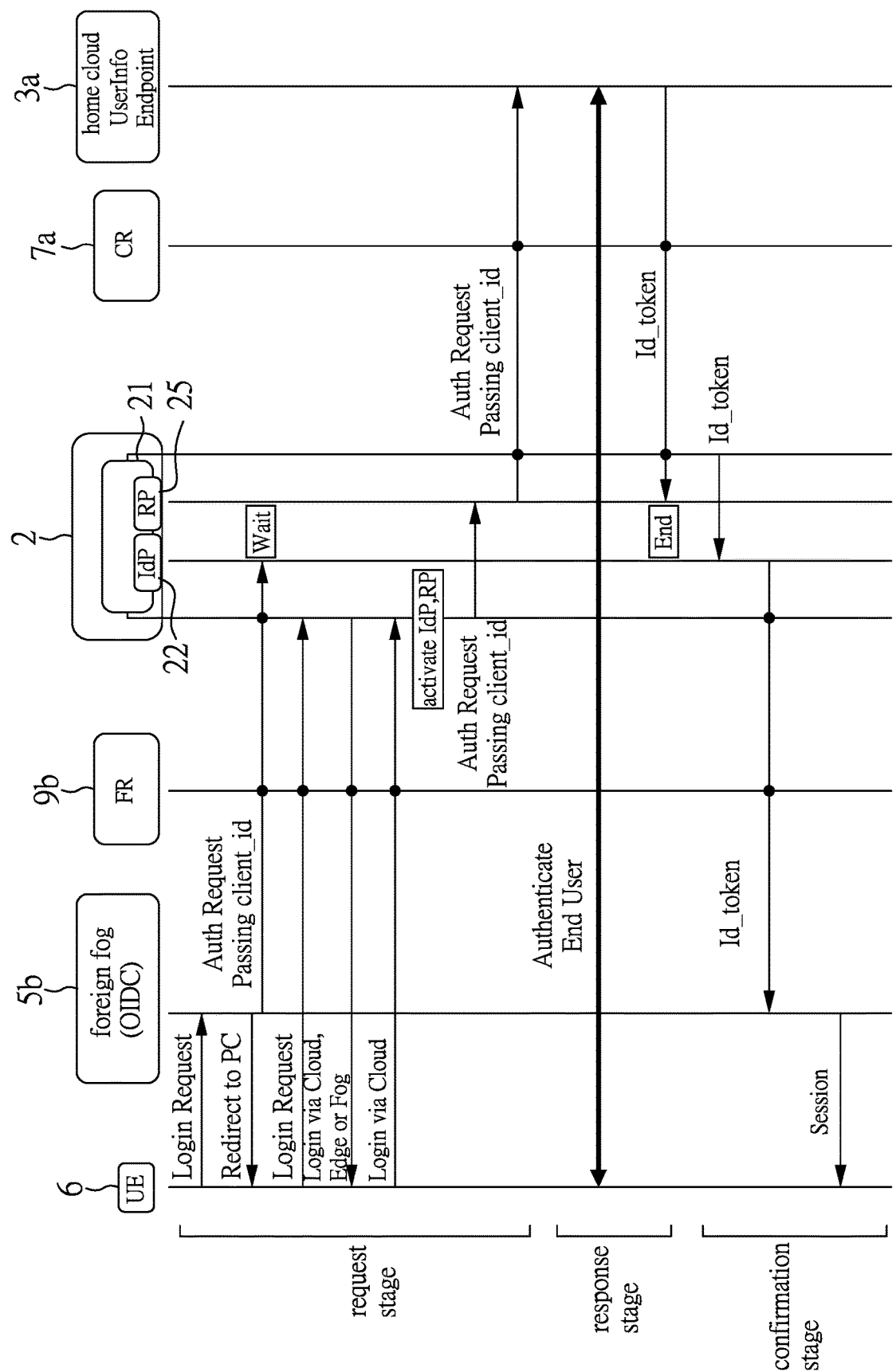
FIG. 21 schematically illustrates the transmission of a cloud-to-fog(OIDC) authentication process according to an embodiment of the present disclosure.
Figure 22:
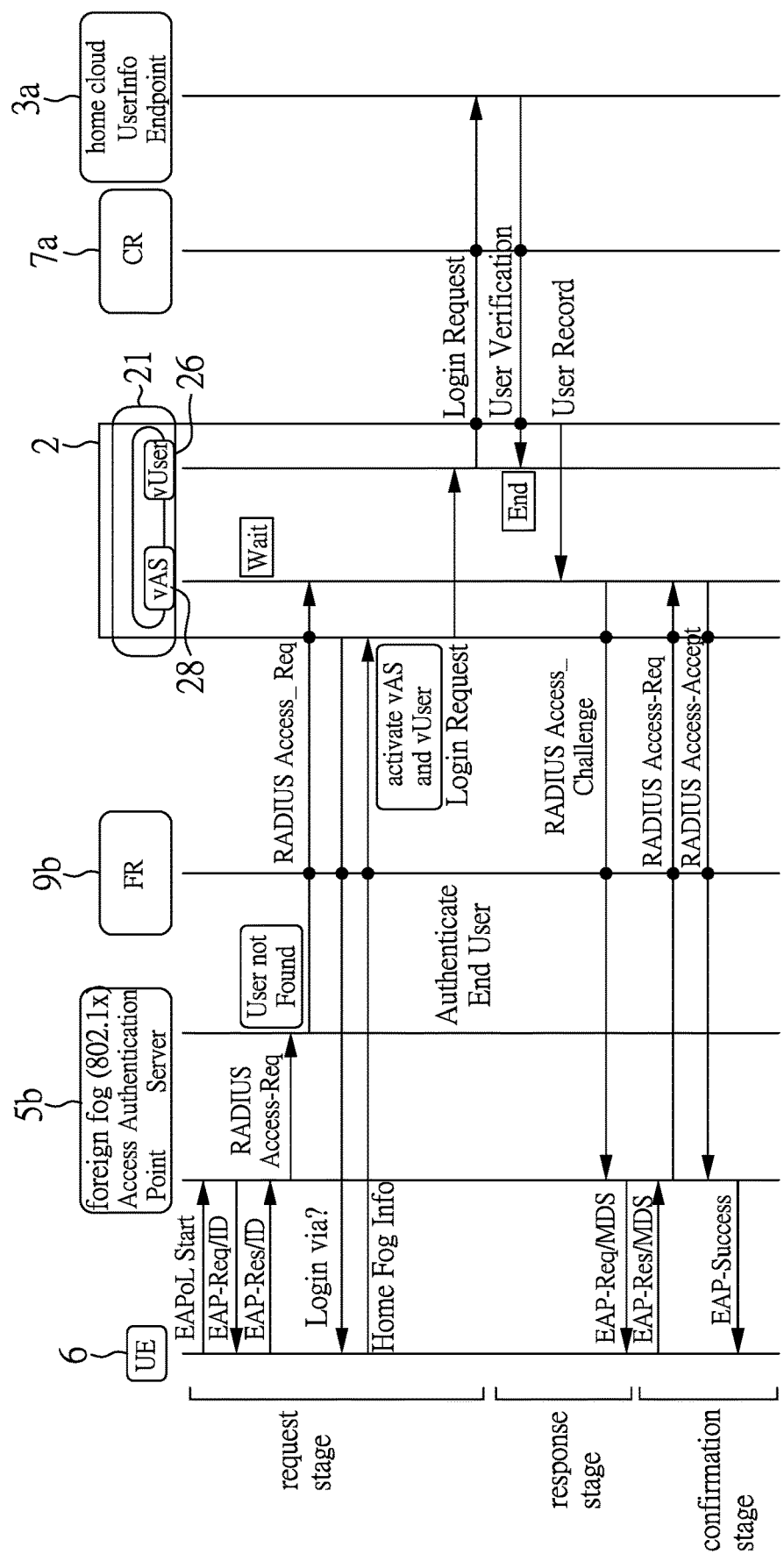
FIG. 22 schematically illustrates the transmission of a cloud-to-fog(802.1x) authentication process according to an embodiment of the present disclosure.

In addition, in order to make the contents of the aforementioned sub-procedure (FIG. 8~FIG. 15) clear, message flows for six commonly used cross-border authentications are provided in FIG. 17 to FIG. 22 for reference. FIG. 17 schematically illustrates the transmission of an edge-to-cloud authentication process according to an embodiment of the present disclosure. FIG. 18 schematically illustrates the transmission of an edge-to-fog(OIDC) authentication process according to an embodiment of the present disclosure. FIG. 19 schematically illustrates the transmission of an edge-to-fog(802.1x) authentication process according to an embodiment of the present disclosure. FIG. 20 schematically illustrates the transmission of a cloud-to-edge authentication process according to an embodiment of the present disclosure. FIG. 21 schematically illustrates the transmission of a cloud-to-fog(OIDC) authentication process according to an embodiment of the present disclosure. FIG. 22 schematically illustrates the transmission of a cloud-to-fog(802.1x) authentication process according to an embodiment of the present disclosure.

Those skilled in the art may better understand the process steps of FIG. 3 to FIG. 15 in view of the aforementioned message flows.

Then, the entry insertion and lookup establishment procedure will be described. The entry insertion and lookup establishment procedure is used to establish a lookup data form, and use the lookup data form. in the authentication process.

Figure 23:
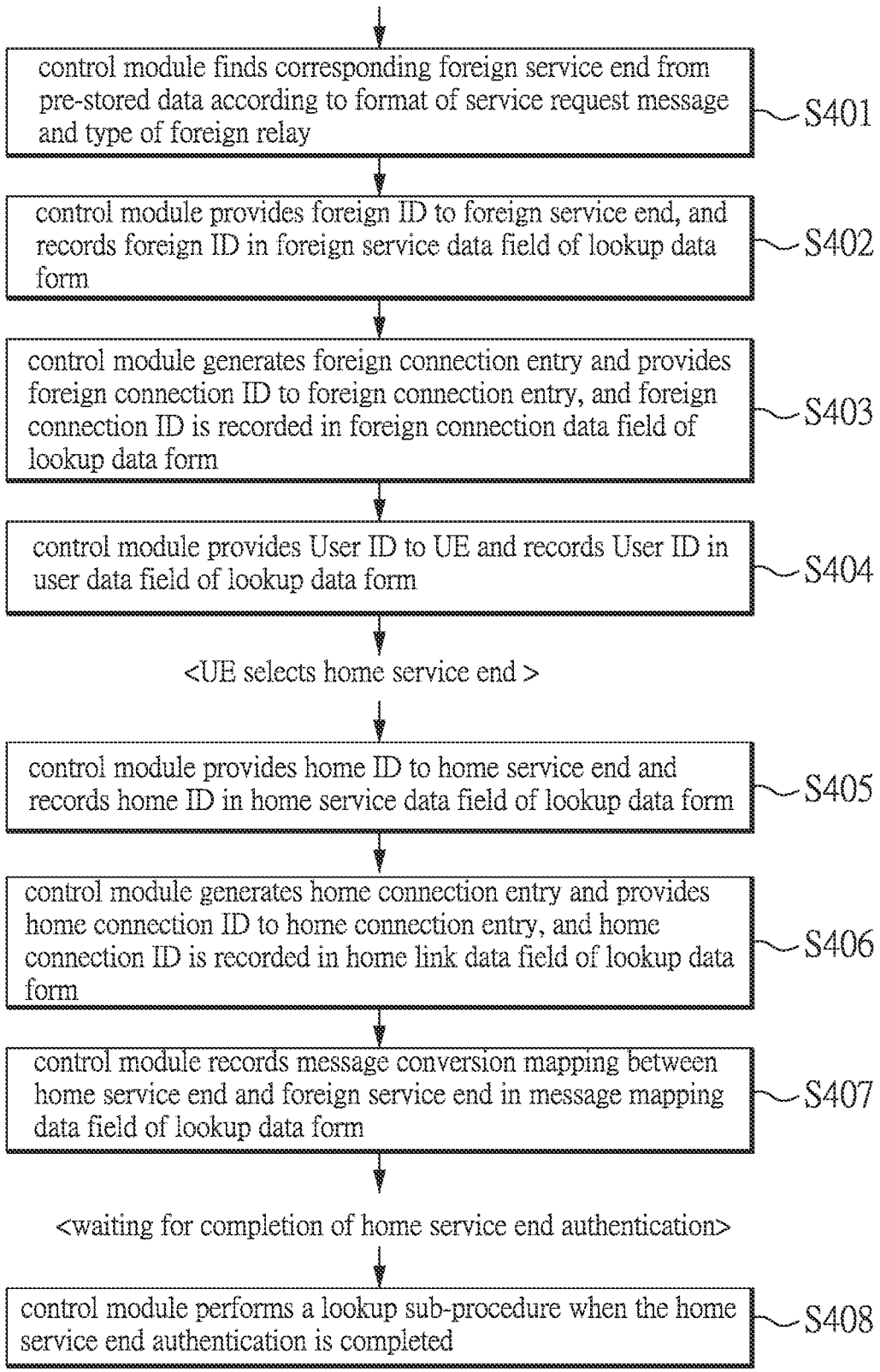
FIG. 23 is a flow chart illustrating the steps of an entry insertion and lookup establishment procedure according to an embodiment of the present disclosure.

FIG. 23 is a flowchart illustrating the steps of an entry insertion and lookup establishment procedure according to an embodiment of the present disclosure, and please refer to FIGS. 1 to 22 at the same time. This process can be applied to various cross-border services.

First, step S401 is executed, in which, when the universal proxy 2 receives the service request message from the foreign relay, the control module 21 finds the corresponding foreign service end from the pre-stored data according to the format of the service request message and the type of the foreign relay. In one embodiment, step S401 may be executed after the initialization phase procedure of FIG. 3, so that the control module 21 may find the corresponding foreign service end through stored information related to the foreign relay in step S13(a), step S14(a), S15(b) or S15(d).

Then, step S402 is executed, in which the control module 21 provides an identity information (hereinafter referred to as foreign ID) to the foreign service end, and records the foreign ID in a foreign service data field of a lookup data form.

Then, step S403 is executed, in which the control module 21 generates a foreign connection entry based on the information required by the foreign server for authentication, and provides an identity information (hereinafter referred to as foreign connection ID) to the foreign connection entry, and the foreign connection ID is recorded in a foreign connection data field of a lookup data form. In one embodiment, the foreign connection entry includes the information of the operation modules required by the foreign service end for authentication, the connection relationship between the operation modules and the relays, the connection relationship between the operation modules, etc., and is not limited to this.

Then, step S404 is executed, in which the control module 21 provides identity information (hereinafter abbreviated as User ID) to the user equipment 6, and records the User ID in a user data field of the lookup data form.

Then, the control module 21 waits for the user equipment 6 to return the login option (please refer to step S241). When the user equipment 6 returns the loin option, that is, when the home service end is selected, step S405 is executed, in which the control module 21 provides identity information (hereinafter abbreviated as home ID) to the home service end, and records the home ID it a home service data field of the lookup data form.

Then, step S406 is executed, in which the control module 21 generates an home connection entry based on the information required by the home service end for authentication, and provides identity information (hereinafter referred to as home connection ID) to the home connection entry, and the home connection ID is recorded in a home link data field of the lookup data form. In one embodiment, the home connection entry includes information of the operation modules required by the home service end for authentication, the connection relationship between the operation modules and the relays, the connection relationship between the operation modules, information (such as IMSI) provided by the user equipment 6, etc., and is not limited to this.

Then, step S407 is executed, the control module 21 records the message conversion mapping between the home service end and the foreign service end in a message mapping data field of the lookup data form. As a result, the lookup data form required for this cross-border service can be established.

Then, the control module 21 may control the appropriate operation modules to participate in the authentication required by the home service end according to the home service data field, the home link data field, or the message mapping data field in the lookup data form and wait for completion of the home service end authentication. When the authentication required by the home service end is completed, step S408 is executed, in which the control module 21 performs a lookup sub-procedure, wherein the lookup sub-procedure may be used for the authentication required by the foreign service end. As a result, the entry insertion and lookup establishment procedure is completed.

Figure 24:
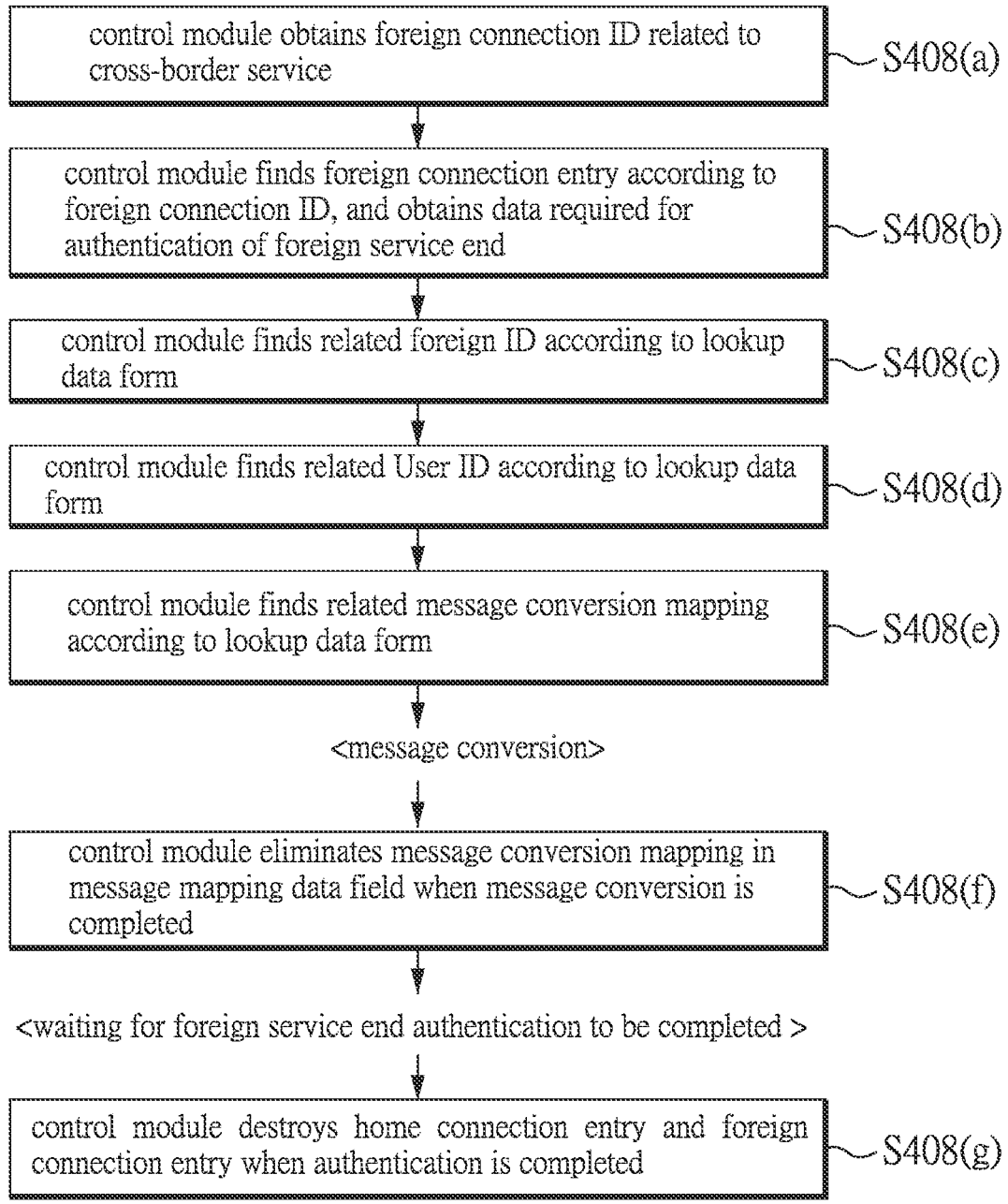
FIG. 24 is a flowchart illustrating the steps of a lookup sub-procedure according to an embodiment of the present disclosure.

Next, the details of the lookup sub-procedure will be explained. FIG. 24 is a flowchart illustrating the steps of the lookup sub-procedure according to an embodiment of the present disclosure, and please refer to FIGS. 1 to 23 at the same time.

First, step S408(a) is executed, in which the control module 21 obtains the foreign connection ID related to this cross-border service. In one embodiment, the control module 21 may find the corresponding lookup data form from the home service end, and then find the foreign connection ID from the lookup data form.

Then, step S408(b) is executed, in which the control module 21 finds the foreign connection entry according to the foreign connection ID, and obtains the data required for the authentication of the foreign service end.

Then, step S408(c) is executed, in which the control module 21 finds the related foreign ID according to the lookup data form.

Then, step S408(d) is executed, in which the control module 21 finds the related User ID according to the lookup data form.

Then, step S408(e) is executed, in which the control module 21 finds the related message conversion mapping according to the lookup data form.

Then, the control module 21 may control the appropriate operation modules to perform the authentication required by the foreign service end according to the foreign connection entry, User ID and foreign ID, and convert the messages in the authentication process to the format of the communication protocol supported by the foreign service end according to the data in the message mapping data field.

Then, step S408(f) is executed, in which, when the message conversion is completed, the control module 21 eliminates the message conversion napping in the message mapping data field.

Then, the control module 21 waits for the authentication required by the foreign service end to be completed. When the authentication is completed, step S408(g) is executed, in which the control module 21 destroys the home connection entry and the foreign connection entry.

As a result, the lookup sub-procedure is completed.

In addition, the communication system 1 of the present disclosure can continue to establish alliance relationships with different communication systems, so that the cross-border services capable of being used by a single account may continue to increase.

Accordingly, through the communication system and communication method of the present disclosure, users are able to access cloud, edge and fog with only a single account. In comparison with the prior art, the communication system of the present disclosure is advantageous in high convenience. In addition, the communication method of the present disclosure is provided with a complete authentication mechanism so as to have high security.

The aforementioned embodiments are examples only for convenience of description. The scope of the present disclosure is claimed hereinafter in the claims and is not limited to the embodiments.

What is claimed is:

1. A communication system for performing a third-party authentication between a home service end and a foreign service end, wherein type of the home service end or the foreign service end is cloud, edge, or fog, the communication system comprising:
    a universal proxy including a microprocessor, wherein the universal proxy communicates with a cloud through a cloud relay, the universal proxy communicates with an edge through an edge relay, and the universal proxy communicates with a fog through a fog relay;
    a control module disposed in the universal proxy; and
    a plurality of operation modules disposed in the universal proxy,
    wherein, the control module and the operation modules are implemented by the microprocessor executing one or more computer program products stored in a non-transitory computer readable medium, and the control module selects at least two of the operation modules to perform the third-party authentication according to the types of the home service end and the foreign service end.

2. The communication system of claim 1, wherein the operation modules include a virtual home subscriber server and, when the foreign service end is a foreign edge, the control module activates the virtual home subscriber server to communicate with the foreign service end.

3. The communication system of claim 2, wherein the operation modules further include a virtual mobility management entity and, when the home service end is a home edge, the control module activates the virtual mobility management entity to communicate with the home service end through the virtual mobility management entity.

4. The communication system of claim 1, wherein the operation modules include a virtual open ID provider and, when the foreign service end is a foreign cloud or a foreign fog, and communication protocol used by the foreign service end is an open identity connect, the control module activates the virtual open ID provider, and communicates with the foreign service end through the virtual open ID provider.

5. The communication system of claim 4, wherein the operation modules further include a virtual relying party and, when the home service end is a home cloud or a home fog, and communication protocol used by the home service end is an open ID connect, the control module activates the virtual relying party and communicates with the home service end through the virtual relying party.

6. The communication system of claim 1, wherein the operation modules include a virtual user and, when the home service end is a home fog or a home cloud, the control module activates the virtual user, and communicates with the home service end through the virtual user.

7. The communication system of claim 1, wherein the operation modules include a virtual user equipment and, when the home service end is an edge and the foreign service end is a foreign cloud or a foreign fog, the control module activates the virtual user equipment and communicates with the home service end through the virtual user equipment.

8. The communication system of claim 1, wherein the operation modules include a virtual authentication server and, when the foreign service end is a foreign fog and communication protocol used by the foreign service end is 802.1x, the control module activates the virtual authentication server (vAS) to communicate with the foreign service end.

9. The communication system of claim 1, wherein the control module performs an initialization phase procedure and an operational phase procedure, in which, in the initialization phase procedure, the control module establishes a communication link between the cloud relay, the edge relay or the fog relay corresponding to the foreign service end and one of the operation modules and, in the operational phase procedure, the control module determines the type of the foreign service end according to type of a request message sent by the cloud relay, the edge relay or the fog relay, so as to determine the type of the home service end according to a selection message sent by a user equipment, thereby selecting thee operation modules.

10. The communication system of claim 9, wherein the control module further performs a lookup data establishment procedure to record information of the home service end and the foreign service end in a lookup data form.

11. A communication method executed by a communication system to perform a third-party authentication between a home service end and a foreign service end, wherein type of the home service end or the foreign service end is cloud, edge or fog, and the communication system includes a control module and a plurality of operation modules, the communication method comprising the steps of:
using the control module to select at least two of the operation modules to perform the third-party authentication according to the types of the home service end and the foreign service end,
wherein the control module and the operation modules are disposed in a universal proxy, the universal proxy communicates with a cloud through a cloud relay, the universal proxy communicates with an edge through an edge relay, and the universal proxy communicates with a fog through a fog relay.

12. The communication method of claim 11, further comprising the step of: when the foreign service end is a foreign edge, using the control module to activate a virtual home subscriber server in the operation modules and communicate with the foreign service end through the virtual home subscriber server.

13. The communication method according to claim 12, further comprising the step of: when the home service end is a home edge, using the control module to activate a virtual mobility management entity in the operation modules and communicate with the home service end through the virtual mobility management entity.

14. The communication method of claim 11, further comprising the step of: when the foreign service end is a foreign cloud or a foreign fog and communication protocol used by the foreign service end is open ID connect, using the control module to activate a virtual identity provider in the operation modules and communicate with the foreign service end through the virtual identity provider.

15. The communication method of claim 14, further comprising the step of: when the home service end is a home cloud or a home fog and communication protocol used by the home service end is open ID connect, using the control module to activate a virtual relying party in the operation modules and communicate with the home service end through the virtual relying party.

16. The communication method of claim 11, further comprising the step of: when the home service end is a home fog or a home cloud, using the control module to activate a virtual user in the operation modules and communicate with the home service end through the virtual user.

17. The communication method of claim 11, wherein, when the home service end is a home edge and the foreign service end is a foreign cloud or a foreign fog, the control module activates a virtual user equipment among the operation modules, and communicates with the home service end through the virtual user equipment.

18. The communication method of claim 11, wherein, when the foreign service end is a foreign fog and uses communication protocol of 802.1x, the control module activates a virtual authentication server in the operation modules, and communicates with the foreign service end through the virtual authentication server.

19. The communication method of claim item 11, further comprising the step of: using the control module to execute an initialization phase procedure and an operational phase procedure, wherein, in the initialization phase procedure, the control module establishes a communication link between the cloud relay, the edge relay or the fog relay corresponding to the foreign service end and one of the operation modules and, in the operational phase procedure, the control module determines the type of the foreign service end according to type of a request message sent by the cloud relay, the edge relay or the fog relay), and determines the type of the home service end according to a selection message sent by a user equipment thereby selecting the operation modules.

20. The communication method of claim 19, further comprising the step of: using the control module to perform a lookup establishment procedure to record information of the home service end and the foreign service end in a lookup data form.

* * * * *